US011964373B2

(12) United States Patent
Hähndel

(10) Patent No.: US 11,964,373 B2
(45) Date of Patent: Apr. 23, 2024

(54) DRIVE-IN TOOL WITH IMPROVED SAFETY DEVICE

(71) Applicant: Illinois Tool Works Inc., Glenview, IL (US)

(72) Inventor: Olaf Hähndel, Laatzen (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/318,410

(22) Filed: May 16, 2023

(65) Prior Publication Data

US 2023/0302615 A1 Sep. 28, 2023

Related U.S. Application Data

(63) Continuation of application No. 17/376,901, filed on Jul. 15, 2021, now Pat. No. 11,667,017, which is a (Continued)

(30) Foreign Application Priority Data

May 6, 2015 (EP) .................................... 15166582

(51) Int. Cl.
*B25C 1/04* (2006.01)
*B25C 1/00* (2006.01)

(52) U.S. Cl.
CPC .............. *B25C 1/008* (2013.01); *B25C 1/047* (2013.01)

(58) Field of Classification Search
CPC ........... B25C 1/008; B25C 1/04; B25C 1/043; B25C 1/047
See application file for complete search history.

(56) References Cited

U.S. PATENT DOCUMENTS 3,033,236 A * 5/1962 Rayman ................ F16K 31/363 408/9
3,572,572 A 3/1971 Readyhough et al.
(Continued)

FOREIGN PATENT DOCUMENTS

DE 102013106657 A1 1/2015
EP 1223009 A2 7/2002
(Continued)

OTHER PUBLICATIONS

International Preliminary Report on Patentability from International Patent Application No. PCT/US2016/030385, dated Nov. 16, 2017 (7 pages).

(Continued)

*Primary Examiner* — Thanh K Truong
*Assistant Examiner* — David G Shutty
(74) *Attorney, Agent, or Firm* — Neal, Gerber & Eisenberg LLP

(57) ABSTRACT

A drive-in tool for driving fasteners into a workpiece, wherein the tool comprises in particular:
- a safety device for transferring the drive-in tool from a trip-ready state into a secured state after expiry of a delay,
- wherein the safety device comprises a control volume and an activation element,
- wherein in the first position of the activation element a charging connection is defined between the control volume and the gas pressure source connection,
- and wherein in the second position of the activation element a discharging connection is defined between the control volume and a pressure sink,
- wherein one connection from the charging connection and the discharging connection comprises a smallest cross-sectional flow area which, together with a gas pressure of the gas pressure source, determines the delay time of the safety device.

(Continued)

Figure 1A:
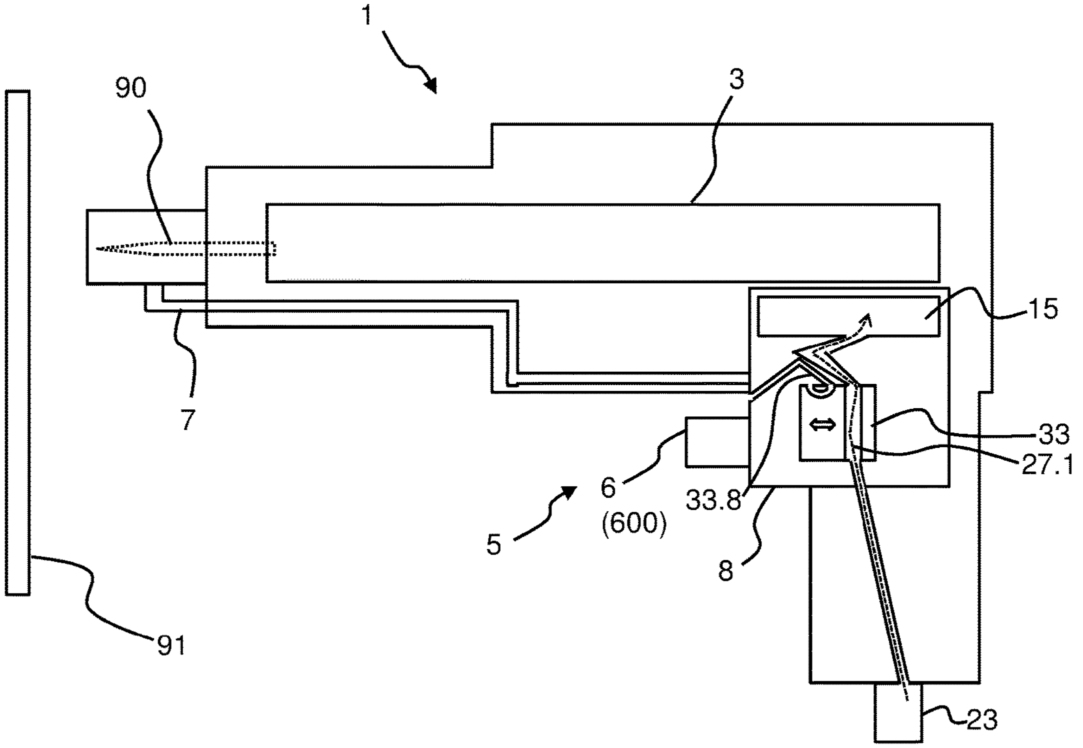

The present disclosure also relates to a corresponding method for operating a drive-in tool.

20 Claims, 12 Drawing Sheets

Related U.S. Application Data continuation of application No. 15/569,265, filed as application No. PCT/US2016/030385 on May 2, 2016, now Pat. No. 11,065,747.

(56) References Cited

U.S. PATENT DOCUMENTS

| | | | | |
|---|---|---|---|---|
| 3,580,455 | A | 5/1971 | Cast et al. | |
| 3,730,414 | A * | 5/1973 | Becht | B25C 1/041 227/130 |
| 3,786,978 | A | 1/1974 | Manganaro | |
| 3,888,404 | A | 6/1975 | Ramspeck et al. | |
| 3,964,659 | A * | 6/1976 | Eiben | B25C 1/043 227/7 |
| 4,351,464 | A | 9/1982 | Fehrs et al. | |
| 4,550,643 | A | 11/1985 | Schwartzenberger | |
| 4,679,719 | A | 7/1987 | Kramer | |
| 5,020,712 | A * | 6/1991 | Monacelli | B25C 1/041 227/8 |
| 5,522,531 | A * | 6/1996 | Ogawa | B25C 1/008 227/8 |
| 5,551,620 | A | 9/1996 | Vallee | |
| 5,605,268 | A | 2/1997 | Hayashi et al. | |
| 5,732,870 | A * | 3/1998 | Moorman | B25C 1/008 227/130 |
| 5,772,096 | A | 6/1998 | Osuka et al. | |
| 5,862,969 | A | 1/1999 | Lee | |
| 5,909,386 | A | 6/1999 | Shiraishi | |
| 5,918,788 | A | 7/1999 | Moorman et al. | |
| 6,145,724 | A | 11/2000 | Shkolnikov et al. | |
| 6,213,372 | B1 | 4/2001 | Chen | |
| 6,357,647 | B1 | 3/2002 | Ou | |
| 6,382,492 | B1 | 5/2002 | Moorman et al. | |
| 6,431,425 | B1 | 8/2002 | Moorman et al. | |
| 6,450,387 | B1 | 9/2002 | Chen | |
| 6,523,621 | B1 * | 2/2003 | Gosis | F15B 11/076 173/206 |
| 6,543,664 | B2 | 4/2003 | Wolfberg | |
| 6,604,664 | B2 * | 8/2003 | Robinson | B25C 1/043 227/8 |
| 6,691,907 | B1 | 2/2004 | Chang et al. | |
| 6,695,193 | B1 | 2/2004 | Chang | |
| 6,695,194 | B1 | 2/2004 | Chang | |
| 7,143,918 | B2 | 12/2006 | Aguirre et al. | |
| 7,163,134 | B2 | 1/2007 | Moeller et al. | |
| 7,225,961 | B1 | 6/2007 | Lee | |
| 7,469,818 | B2 | 12/2008 | Saltsov et al. | |
| 7,510,105 | B2 | 3/2009 | Moeller et al. | |
| 7,513,402 | B2 | 4/2009 | Miyashita et al. | |
| 7,828,072 | B2 | 11/2010 | Hashimoto et al. | |
| 7,971,766 | B2 | 7/2011 | Tang | |
| 7,975,890 | B2 | 7/2011 | Tang | |
| 8,011,441 | B2 | 9/2011 | Leimbach et al. | |
| 8,313,012 | B2 | 11/2012 | Shima et al. | |
| 8,336,749 | B2 | 12/2012 | Largo | |
| 8,348,118 | B2 | 1/2013 | Segura | |
| 9,061,407 | B2 | 6/2015 | Chien et al. | |
| 9,242,359 | B2 | 1/2016 | Staples et al. | |
| 9,381,633 | B2 | 7/2016 | Moore et al. | |
| 9,486,907 | B2 | 11/2016 | Birk | |
| 9,550,288 | B2 | 1/2017 | Moore et al. | |
| 9,662,776 | B2 | 5/2017 | Puppala et al. | |
| 10,596,690 | B2 * | 3/2020 | Weigmann | B25C 1/047 |
| 11,065,747 | B2 * | 7/2021 | Hähndel | B25C 1/047 |
| 11,065,749 | B2 * | 7/2021 | Knight | B25C 1/008 |
| 11,185,967 | B2 * | 11/2021 | Oouchi | B25C 1/043 |
| 11,229,996 | B2 * | 1/2022 | Nagao | B25C 1/04 |
| 11,667,017 | B2 * | 6/2023 | Hähndel | B25C 1/047 227/8 |
| 2012/0097730 | A1 | 4/2012 | Liang et al. | |
| 2012/0104070 | A1 | 5/2012 | Wu et al. | |
| 2014/0231485 | A1 * | 8/2014 | Bauer | B25C 1/008 227/8 |
| 2018/0117747 | A1 * | 5/2018 | Hahndel | B25C 1/047 |

FOREIGN PATENT DOCUMENTS

| | | | |
|---|---|---|---|
| EP | 2450152 | A2 | 5/2012 |
| EP | 2767365 | A1 | 8/2014 |
| EP | 2832502 | A1 | 2/2015 |
| WO | 2014209481 | A1 | 12/2014 |

OTHER PUBLICATIONS

International Search Report and Written Opinion from International Patent Application No. PCT/US2016/030385, dated Aug. 18, 2016 (10 pages).

* cited by examiner

DRIVE-IN TOOL WITH IMPROVED SAFETY DEVICE

PRIORITY CLAIM

This patent application is a continuation of and claims priority to and the benefit of U.S. patent application Ser. No. 17/376,901, which was filed on Jul. 15, 2021, which is a continuation of and claims priority to and the benefit of U.S. patent application Ser. No. 15/569,265, which was filed on Oct. 25, 2017, now issued as U.S. Pat. No. 11,065,747 on Jul. 20, 2021, which is a national stage entry of and claims priority to and the benefit of PCT Application No. PCT/US2016/030385, which was filed on May 2, 2016, which claims priority to and the benefit of European Patent Application No. 15166582.5, which was filed on May 6, 2015, the entire contents of which are incorporated herein by reference.

The present disclosure relates to a drive-in tool for driving fasteners into a workpiece by way of drive-in cycles where a safety device is to prevent unintentional tripping after a predetermined time when the trigger is actuated.

A generic drive-in tool is shown in DE 10 2013 106 657 A1 which is a valuable contribution to the prior art. In the case of said drive-in tool, a safety device, designated there as a resetting arrangement, is activated by a first drive cycle which is carried out in the single trip mode which is named as such in this case. The safety device transfers the tool into a secured state after a pre-determined delay time insofar as the trigger remains pressed and insofar as no drive cycle takes place within the delay time.

EP 2 767 365 A1 relates to a pneumatic nail driving tool which, among other things, comprises a second control valve which, when the tripper is actuated, is driven independently of an actuation of the contact sensor, a chamber which is either ventilated or vented by way of a throttle when the second control valve is actuated, and a blocking piston which is displaced from an idle position into a blocking position when the pressure in the chamber passes a pre-determined pressure threshold, and which prevents the tripping of a drive-in operation in the blocking position.

The inventor found the prior art to be disadvantageous insofar as to increase safety the flexibility of tool use is limited and/or a costly structural design is necessary. One object of the present disclosure was to improve the disadvantages of the prior art, in particular to increase the flexibility of tool use and at the same time to ensure comparable safety.

Various objects are achieved by the tool defined by the independent claims. Advantageous further developments of the tool are defined in the dependent claims.

In particular, one object is achieved by a drive-in tool for driving fasteners into a workpiece, wherein the tool comprises:

an actuator unit, by way of which the fasteners are drivable into the workpiece in drive-in cycles, a trip arrangement, by way of which the drive-in cycles of the actuator unit are trippable, wherein the trip arrangement comprises a trigger element which is manually operable and comprises an idle state and a pressed state, wherein the trip arrangement further comprises a workpiece contact element which is actuatable by placing the drive-in tool onto the workpiece, a gas pressure source connection to which a gas pressure source is connectable, a safety device which is coupled with the trigger element and is set up to bring about a transfer of the drive-in tool from a trip-ready state into a secured state after expiry of a delay time which proceeds from an activation of the safety device, wherein the safety device comprises a control volume, wherein the safety device comprises an activation element which is changeable between a first and a second position by way of the trigger element, wherein in the first position of the activation element a pneumatic connection is defined, in a preferred manner by way of the activation element, between the control volume and the gas pressure source connection, which is hereafter referred to as charging connection, and wherein in the second position of the activation element a pneumatic connection is defined, in a preferred manner by way of the activation element, between the control volume and a pressure sink, which is hereafter referred to as discharging connection, and wherein in a preferred manner at least one connection from the charging connection and the discharging connection comprises a smallest cross-sectional flow area which, together with a gas pressure of the gas pressure source, determines the delay time of the safety device.

One object is further achieved in particular by a method for driving fasteners into a workpiece wherein the fasteners are driven by way of an actuator unit into the workpiece in drive-in cycles, wherein the drive-in cycles of the actuator unit are tripped by way of a trip arrangement, wherein a trigger element of the trip arrangement is manually operated and in this case is moved from an idle state into a pressed state, wherein a workpiece contact element is actuated by placing the drive-in tool onto the workpiece, wherein a gas pressure source connection is connected to a gas pressure source, wherein a safety device which is coupled with the trigger element brings about a transfer of the drive-in tool from a trip-ready state into a secured state after a delay time which proceeds from an activation of the safety device, by an activation element being changed between a first and a second position by way of the trigger element, wherein in the first position of the activation element a first pneumatic connection is defined in a preferred manner by way of the activation element between the control volume and the gas pressure source connection, which is hereafter referred to as charging connection, and wherein in the second position of the activation element a second pneumatic connection is defined in a preferred manner by way of the activation element between the control volume of the safety device and a pressure sink, which is hereafter referred to as discharging connection, wherein a maximum gas flow, which determines the delay time of the safety device, flows through in a preferred manner at least one connection from the charging connection and the discharging connection.

In contrast to the drive-in tool mentioned in the introduction, the flexibility of the tool use is increased, as the safety device is activatable independently of the state of the workpiece contact element and consequently a first single trip mode drive-in cycle does not have to be performed first of all in order to activate the safety device for the first time. The user is able to operate the tool from the start after choosing single trip mode or contact release mode (an operating mode in which drive-in operations are able to be tripped within the delay time of the safety device by successively placing and actuating the workpiece contact element with the trigger element held pressed in each case). At the same time, comparable safety is maintained in this case as the safety device still transfers the tool into a secured state after a pre-determined delay time such that even if the user inadvertently presses the trigger before the user has tripped a first drive cycle, unintentional tripping of a drive-in cycle is only possible within the pre-determined delay time, otherwise however it is not. The tool comprises an activation element for this purpose by way of which an activation of the safety device is coupled with the trip movement by the displacement of the activation element by the trigger element when the trigger element is pressed being utilized to cause the safety device to be activated.

Fasteners are, for example, nails, pins or special screws that are able to be driven-in. Wood, metal or concrete can be considered as the example workpiece.

In a preferred manner, the actuator unit is a pneumatic actuator unit where the expenditure of force necessary for the driving-in is provided purely from pneumatic energy. In a preferred manner, the actuator unit comprises an operating piston which is guided in an operating cylinder. In a preferred manner, in this case, the actuator unit comprises a main trip valve, in a preferred manner a non-return valve, by way of which the operating cylinder is fillable abruptly with compressed air such that the drive-in piston is moved in the direction of the tool tip. In a preferred manner, the operating piston is connected to a drive-in piston which acts upon the fasteners to be driven-in. A drive-in cycle is a recurring sequence which the actuator unit carries out for consecutively driving-in fasteners.

In the trip-ready state, it is possible for the user to trip a drive-in cycle—in the secured state this is not possible for the user to do.

In a preferred manner, the control volume is an interior of the tool which is set up for the temporary storage of pneumatic energy. In a preferred manner, it is arranged directly adjoining the tool working cylinder which contains the working piston. In a preferred manner, it surrounds the lateral surface of the operating cylinder completely by 360° at least in one region. In a preferred manner, the tool comprises a ventilation arrangement (e.g., openings in the operating cylinder), by way of which the control volume is fillable with compressed air during the course of the drive-in operation.

The trigger element, for example, can be pivotable or linearly displaceable, e.g., a lever or knob. In a preferred manner, it is pre-stressed into the idle state by way of a spring. In a preferred manner, the trigger element is set up to activate the safety device by a change from its idle state into the pressed state (even) when the workpiece contact element is not actuated.

In a preferred manner, one position from the first and the second position of the activation element is an activation position for activating the safety device, i.e., a change in the activation element from the other position into the activation position allows a delay time to start to elapse before the safety device then transfers the tool into the secured state. In a preferred manner, the activation element is in the activation position when the trigger element is in the pressed state.

The term pneumatic connection between two locations/objects is to be understood in a preferred manner as a fluid-permeable pathway (from start to finish) or, where applicable, as the sum of all the fluid-permeable pathways which, where applicable, connects or connect the two locations/objects together such that fluid is able to flow from the one to the other location/object. In a preferred manner, the pneumatic connection produced from the charging connection and the discharging connection, which is provided by way of the activation element in the activation position, is the connection which comprises the smallest cross sectional flow area which, together with the gas pressure of the gas pressure source connection, determines the delay time. In a preferred manner, said connection is the discharging connection, i.e., by way of which air from the control volume flows to the pressure sink. In a preferred manner, the discharging connection extends through one, in a preferred manner two openings in the activation element (in a preferred manner present in a lateral surface of an activation element which is realized as a tube piece). In a preferred manner, said opening forms a smallest cross sectional flow area which, together with the gas pressure, defines the pre-determined delay time. In a preferred manner, an adjusting needle which forms a needle valve is arranged in said opening, said adjusting needle in a preferred manner being conically tapered and it consequently being possible to modify the cross sectional flow area of the opening by displacing the needle, e.g., by way of rotating an adjusting screw on which the needle is arranged. As a result of the needle, a particularly small cross sectional flow area is achieved, in a preferred manner smaller than can be achieved using a conventional drill. The charging connection and/or the discharging connection are delimited in a preferred manner by one or several of the following components, i.e., for example, the connection extends along the corresponding element and/or through an opening or groove (e.g., between two O-ring seals) of the corresponding element: activation element, housing of the trip valve (see below), standby element (see below) and trip element.

On account of the smallest cross section flow area, the one connection produced from the charging connection and the discharging connection comprises a high flow resistance which enables slow discharging or charging (depending on the case).

In a preferred manner, the safety device is set up to transfer the tool from the secured state into the trip-ready state (and in a preferred manner to keep the same stable in said state), when the tool is connected to an energy supply and the trigger element is situated in the idle state thereof. As a result, the trip-ready state of the tool is defined as a standard state such that the user finds the instrument with the trigger not pressed and the energy source connected in the trip-ready state and the trip-ready state does not only have to be achieved by a first special drive-in cycle (e.g., single tripping).

Figure 10:
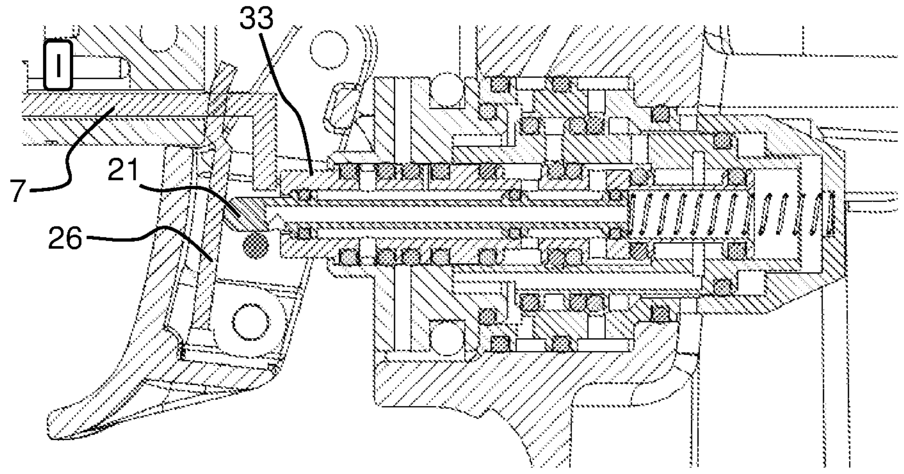
Figure 11:
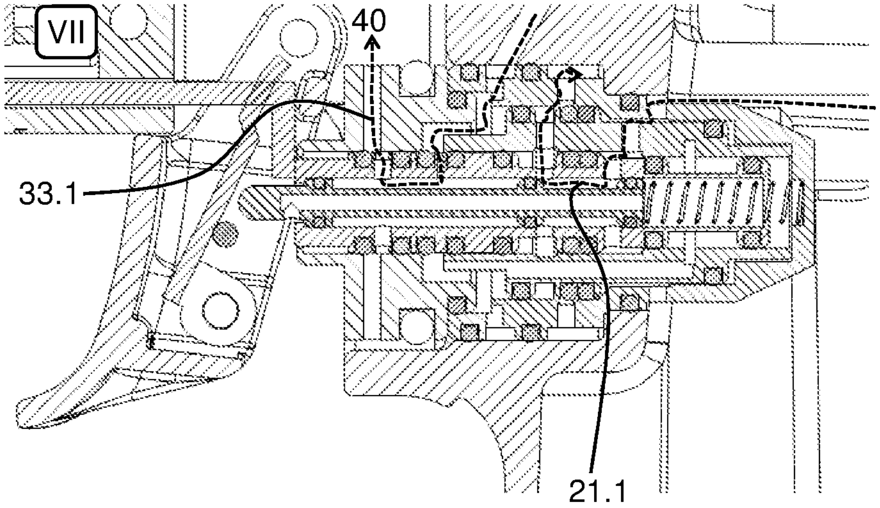
Figure 12:
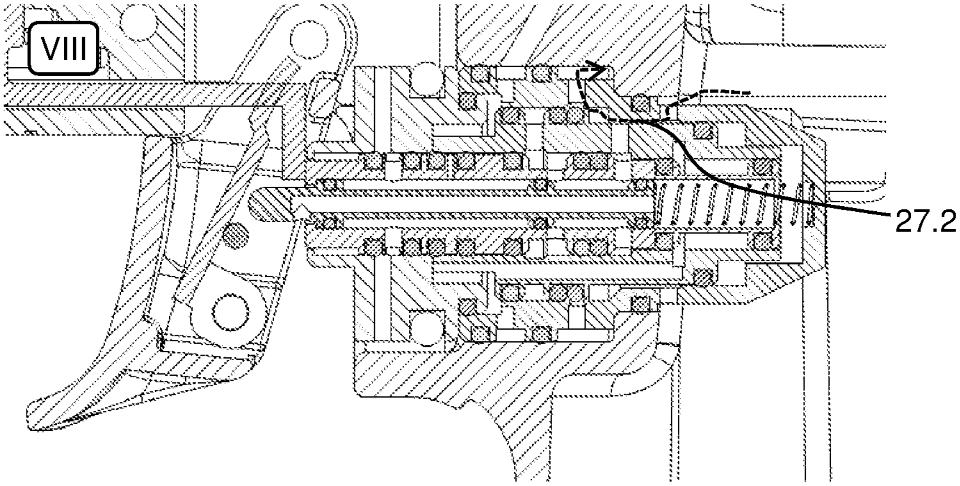

An activation of the safety device is to be understood in a preferred manner as an activation of a countdown, the countdown running for as long as the safety device is activated—the safety device is deactivated in a preferred manner by being reset (either by a drive-in operation or by the trigger—or in a preferred variant according to FIGS. 10 to 12 the trigger element and the workpiece contact element—being transferred into the idle state again) or by the pre-determined time elapsing, i.e., a countdown runs in the activated state of the safety device, whilst in the deactivated state no countdown runs. In the deactivated state of the safety device the tool is able to be situated in the secured or in the trip-ready state—both are possible.

In a preferred manner, the safety device is resettable as a result of a drive-in cycle (the drive-in cycle is only possible as long as the safety device has not yet brought about a transfer of the tool into the secured state) or as a result of a change of the trigger element—or in a preferred variant according to FIGS. 10 to 12: the trigger element and the workpiece contact element—from the pressed state into its idle state. As a result, the user is able to keep the instrument in the standby state by way of each of said two actions. Consequently, for example, continuous operation is realizable in the contact cycle without the trigger having to be released and in addition the releasing of the trigger also causes the safety device to be reset, in this case the tool also being transferred into the trip-ready state insofar as the tool was situated in the secured state.

In a further exemplified embodiment of the present disclosure, the correspondingly other connection from the charging connection and the discharging connection comprises a larger smallest cross-sectional flow area than the one connection from the charging connection and the discharging connection. In a further method according to the present disclosure, a stronger gas flow flows through the correspondingly other pneumatic connection at the same applied pressure than in the one connection.

As a result, once the trigger (without bringing about a trip) has been held pressed until the safety device has transferred the tool into the secured state, the non-secured state can be assumed again quicker, i.e., within a shorter time period than the delay time, which, for example, in the case of a sufficiently large minimal cross sectional flow area of the other connection from the charging connection and the discharging connection can even be immediately perceptible. On account of the larger smallest cross sectional flow area, the other connection from the charging connection and the discharging connection comprises a low flow resistance which enables rapid discharging or charging (depending on the case).

In a further exemplified embodiment of the present disclosure, the smallest cross sectional flow area, which, together with the gas pressure, determines the delay time of the safety device, is arranged in precisely one of the following pneumatic connections:

- in a pneumatic connection between the activation element and the gas pressure source connection;
- in a pneumatic connection between the activation element and the pressure sink;
- in a pneumatic connection which exists in both the first and the second position of the activation element between the control volume and the gas pressure source connection;
- in a pneumatic connection which exists in both the first and the second position of the activation element between the control volume and the pressure sink. In a further method according to the present disclosure, the gas flow which defines the delay time flows in a corresponding pneumatic connection.

As a result, alternative advantageous realizations for different cross sectional flow areas of the charging connection and the discharging connection are provided since this means that a separate by-pass line with a non-return valve is not necessary. In a preferred manner, along the pneumatic path between the smallest cross sectional flow area which defines the delay time and at least one from the pressure sink and the gas pressure source connection, there is no line portion present which is utilized in common both for the charging connection and for the discharging connection.

In a further exemplified embodiment of the present disclosure, the tool comprises a pneumatic line which is both part of the charging connection and part of the discharging connection and which extends from the activation element toward the control volume, and wherein the tool further comprises two lines which are separate from one another, wherein one of the lines which are separate from one another is part of the charging connection and in a preferred manner is not part of the discharging connection and extends from the activation element toward the gas pressure source connection and the other of the lines which are separate from one another is part of the discharging connection and in a preferred manner is not part of the charging connection and extends from the activation element toward the pressure sink, wherein the smallest cross-sectional flow area, which, together with the gas pressure, determines the delay time of the safety device, is present in precisely one of the lines which are separate from one another.

As a result, a Y configuration is provided with the activation element as the node point, by way of which the different cross sectional flow areas of the discharging and charging connection are realizable in a structurally advantageous manner. As an alternative to such a Y configuration, the tool comprises in a preferred manner a bridging line and the smallest cross section flow area is situated in the common line and is bridged or connected in parallel by way of the bridging line in a position (from the first and second position) of the activation element and is not bridged or connected in parallel in the other position of the activation element such that on the whole a larger cross sectional flow area is produced in the one position than in the other position.

In a further exemplified embodiment of the present disclosure, the safety device is set up to transfer the tool into the secured state if a pressure threshold in the control volume is fallen below. In a further method according to the present disclosure, the tool is correspondingly transferred into the secured state.

As a result, the safety of the tool is further increased as a lower pressure provides a more stable state than a higher pressure and the tool, striving for the more stable state (also generally in the event of malfunctions), is consequently blocked more securely should unexpected failures occur in any components (e.g., control volume leakage).

In a further exemplified embodiment of the present disclosure, the charging connection is present when the trigger element (and in a preferred manner the workpiece contact element) is situated in its idle state. In a further method according to the present disclosure, the control volume is filled with compressed air when the trigger element (and in a preferred manner the workpiece contact element) is in its idle state.

As a result, the control volume is fillable with the trigger element released (and in a preferred manner with the workpiece contact element not actuated) such that in the trip-ready state a high air pressure is present in the control volume.

In a further exemplified embodiment of the present disclosure, the trip arrangement comprises a trip valve which is coupled, preferably mechanically, with the trigger element. In a further method according to the present disclosure, a trip valve is operated by way of the trigger element.

In a preferred manner, component parts of the trip valve are one or several of the following components: trip valve housing, activation element, trip element (see below) and standby element. In a preferred manner, the trip valve is coupled with the trigger element purely mechanically by way of solid bodies (without fluid). In a preferred manner the trip valve is accommodated in a trip valve housing which is separate to the housing of the tool and is consequently simple to replace or retrofit. In a preferred manner, the activation element, in a preferred manner also the standby element, in a preferred manner also the trip element, is accommodated in the trip valve housing. The activation element, in a preferred manner also the standby element, in a preferred manner also the trip element, is in each case in a preferred manner part of the trip valve. The trip valve housing is sleeve-shaped in a preferred manner with a front region which faces the trigger element and a rear region which is remote from the trigger element. On the front side it comprises in a preferred manner an open end face and on the rear side a substantially closed end face. In a preferred manner, the tool comprises a venting line for the preferred permanent connection of a volume which is (also) defined by the rear region of the trip valve housing, e.g., this is a line provided in the tool housing, in a particularly preferred manner, however, a line which is defined by the trip valve (and is consequently simple to retrofit) and which in a preferred manner extends from the rear region toward the front region, e.g., an axial channel in the trip element (see below) or an axial channel or a preferred outer axial groove in the trip valve housing. As a result of venting the said volume, the accuracy of the valve is increased in particular as then no disadvantageous pressure fluctuations are formed there just as a result of the movements of the trip valve components in the trip valve housing.

In a further exemplified embodiment of the present disclosure, the control volume is realized by way of the trip valve.

This provides a compact design of the safety device which is also easily retro-fittable by way of replacing a conventional trip valve by a trip valve according to the present disclosure. An existing tool housing can consequently continue to be utilized and it is not necessary to modify the tool housing (to a large extent or at all) in order to provide the control volume. The term realize is to be understood in a preferred manner as a housing and/or one or several component parts of the trip valve defining a space which is controllable in a fluid-technical manner per discharging connection and charging connection. This does not exclude existing spaces in the tool housing being able to define parts of the control volume. In a preferred manner, in this case, however, more than 50%, in a preferred manner 75% and in a quite preferred manner 90% of the control volume is realized by the trip valve or only tool housing regions which are directly adjacent the trip valve defines the control volume. In a particularly preferred manner, the control volume is completely integrated into the trip valve. It is particularly preferred in this case when an adjusting needle is arranged as mentioned beforehand in the opening or the cross section which determines the delay time of the safety device, as then the control volume can be designed to be very small and space-saving. Surprisingly, it has additionally been ascertained that, although a reduction in the control volume makes greater demands on the accuracy of the smallest cross sectional flow for defining the delay time, said reduction also provides the advantage of resetting the control volume in an even faster manner, as even less air has to be replaced in order to influence the pressure in the control volume.

In a further exemplified embodiment of the present disclosure, when the tool is in the trip-ready state and the trigger element is in the pressed state and at the same time the workpiece contact element is actuated, the trip valve defines a pneumatic connection which is the discharging connection or another discharging connection between the control volume and the pressure sink insofar as the charging connection comprises the smallest cross-sectional flow area, and is the charging connection or another charging connection between the control volume and the gas pressure source connection insofar as the discharging connection comprises the smallest cross-sectional flow area. In a further method according to the present disclosure, a pneumatic connection is correspondingly defined.

As a result, the control volume can be reset by way of the trip valve in the state of the tripping of a drive-in operation. It is consequently not necessary to provide a separate line or connection from the drive-in piston to the control volume or indirect control of a control volume ventilation/venting mechanism by way of a pressure tapped from the drive-in piston. This is possible as according to the present disclosure use is made of the movement of the components of the trip valve which are present in any case in order to bring about the ventilation/venting of the control volume. In addition, an advantage in this case is that the resetting of the control volume is effected in a more secure manner as the resetting is brought about in a more direct manner, and not in an indirect manner by way of the drive-in piston. In certain drive-in situations the drive-in piston could move back into its starting position again too quickly and consequently the gas pressure in the control volume would only be partially reset. The dwelling of the trigger and the workpiece contact element in the pressed or actuated position is slower on account of the direct human interaction and consequently provides a longer time for ventilating/venting the control volume. In general, for example, the contact trip mode is advantageously enabled as a result of resetting the control volume (i.e., moving into the state in which it is situated when the gas pressure is connected, the trigger element not pressed and the workpiece contact element not actuated).

In a further exemplified embodiment of the present disclosure, the connection from the loading connection and the discharging connection which comprises the smallest cross-sectional flow area is present both in the first position of the activation element and in the second position of the activation element.

As a result, the complexity of the activation element is reduced with reference to said functionality as it does not have to switch between the connections, but is to be able to disconnect and connect only one of said connections. In a preferred manner, the one connection from the loading connection and the discharging connection which comprises the smallest cross-sectional flow area is present in each state of the tool and its components. In a further exemplified embodiment of the present disclosure, the activation element is additionally changeable between the first and the second position by way of the workpiece contact element. In a further method according to the present disclosure, the activation element is additionally changed correspondingly between said two positions by way of the workpiece contact element.

As a result, safety is increased even further as the safety device is activatable whenever just the workpiece contact element is activated.

In a preferred manner, the activation element is movable into the one position (in a preferred manner the activation position) by the trigger element or the workpiece contact element, i.e., actuation of one of said elements is sufficient, both elements can also be actuated. In contrast, both elements have to be non-actuated so that the activation element is able to assume the other position again.

In a further exemplified embodiment of the present disclosure, the activation element is resettable pneumatically into the position from its first and second position in which the activation element is situated in the idle state of the trigger element. In a further method according to the present disclosure, the activation element is moved pneumatically in the direction of the corresponding position.

As a result, it is possible to dispense with a resetting spring for the activation element. In a preferred manner, for this purpose the activation element comprises a surface difference of surfaces which are acted upon by gas from the gas pressure source connection less surfaces which are connected to the pressure sink, the surface difference being positive.

In a further exemplified embodiment of the present disclosure, the safety device comprises a standby element which is displaceable pneumatically into a safety position and a standby position, wherein the tool is in the secured state when the standby element is in the safety position, and wherein the tool is in the triggered state when the standby element is in the standby position. In a further method according to the present disclosure, the safety device transfers the drive-in tool from the tripped state into the secured state by way of pneumatically displacing a standby element from a standby into a safety position.

As a result, a development of the safety device is provided which enables the safety/readiness of the tool by way of pneumatics and the standby element.

In a further exemplified embodiment of the present disclosure, the standby element is arranged, in particular in a pneumatic or fluidic manner, between the control volume and the gas pressure source connection and the charging connection is guided through an opening in the standby element. In a further method according to the present disclosure, gas from the gas pressure source connection is guided through an opening in the standby element and on to the control volume.

As a result, the control volume is fillable with air by way of the standby element—in contrast to the drive-in tool named in the introduction where the control volume is only filled by way of the operating piston, it is consequently also possible to fill the control volume without any drive-in cycle. In addition, as a result a structure is obtained by way of which pneumatic safety is able to be achieved as the standby element provides part of the charging connection.

In a further exemplified embodiment of the present disclosure, the standby element comprises, a first surface region with a first surface area which can be acted upon by gas pressure from the control volume when the trigger element is in its pressed state, and a second surface region with a second surface area which can be acted upon by gas pressure from the gas pressure source connection when the trigger element is in its pressed state and in a preferred manner when the trigger element is it its idle state;

the first and the second surface regions being set up to direct opposing displacement forces onto the standby element 27 when acted upon with pressure (for which purpose they comprise in a preferred manner opposing components of surface normals) and the first and second surface region being situated in a common pneumatic volume when the activation element is situated in the first position and being in two separate volumes when the activation element is situated in the second position.

In a further method according to the present disclosure, the standby element is pneumatically displaced over two opposing surface regions and the volumes in which the surface regions are situated in each case are connected together pneumatically (directly, i.e., without substantial flow resistance between them) when the activation element is changed into the first position, and they are separated from one another pneumatically when the activation element is changed into the second position.

As a result, when the trigger element is situated in its pressed state, the position of the standby element is determined by two antagonistically acting surface regions and the pressure difference between the pressure in the control volume and the pressure in the gas pressure source. As the gas pressure source is substantially constant, the position of the standby element is consequently substantially dependent on the change in pressure in the control volume. As a result of the possibility of connecting the volumes in which the two different surface regions are situated by way of the activation element, very rapid pressure equalization and consequently very rapid resetting of the standby element actively by the user is provided by way of the trigger element (which is coupled with the activation element).

In a further exemplified embodiment of the present disclosure, the first surface area is larger than the second surface area.

As a result, it is possible to dispense with the use of any springs which press the standby element into an idle position. The position and positioning of the standby element and the time constant realized by the standby element is consequently constant for different gas pressures, which is not possible using a spring element with a spring constant which is not adapted to other gas pressures.

In a further exemplified embodiment of the present disclosure, the standby element is realized as a tube piece which is open at both end faces and comprises a central through channel.

As a result, an extremely compact design is achieved. In a preferred manner the tube piece comprises different outside diameters. It is displaceably mounted in a valve housing in a preferred manner. The valve housing also comprises in a preferred manner analogously corresponding, different inside diameters. The different diameters enable a simple realization of antagonistically acting surface regions with different surface areas.

In a further exemplified embodiment of the present disclosure, the tube piece comprises, along with the through channel, an axial secondary channel which comprises an inner opening, which faces the through channel and in a preferred manner is radial, and an outer opening, which is at an axial spacing from said inner opening, faces the outside surrounding area of the tube piece and in a preferred manner is radial. In a further method according to the present disclosure, a gas flow is directed from the gas pressure source connection through the corresponding axial secondary channel of the tube piece for charging the control volume.

As a result, a compact design and advantageous guiding of the charging connection is made possible. In a preferred manner, the two openings in each case form the end of the axial secondary channel.

In a further exemplified embodiment of the present disclosure, the activation element together with the standby element are arranged as a trip valve or as part of the trip valve of the trip arrangement in a trip valve housing which is insertable into a tool housing.

As a result, the substantial movable parts of the safety device (activation element, standby element) are combined as a compact assembly which is consequently simple to mount, space-saving and/or retro-fittable.

In a further exemplified embodiment of the present disclosure, the activation element is movably guided on the standby element and relative to the standby element. In a further method according to the present disclosure, the activation element is guided in a corresponding manner.

As a result, a compact design is obtained as the activation element and standby element interact directly with one another in this manner and no additional guiding parts have to be provided. In a preferred manner, the activation element is received by the standby element. In a preferred manner, a contour of the activation element or a sealing element (e.g., sealing rings) of the activation element abuts (directly) against a contour of the standby element or against a sealing element (e.g., sealing ring) of the standby element.

In a further exemplified embodiment of the present disclosure, the activation element and the standby element are nested in one another and in a preferred manner are concentric.

As a result, the design is very compact. In a particularly preferred manner, the activation element is received concentrically in the standby element which is realized as a tube piece, an outside contour of the activation element or outer sealing elements (e.g., sealing rings) of the activation element abut (directly) against the inside contour of the standby element or against inner sealing elements (e.g., sealing rings) of the standby element.

In a further exemplified embodiment of the present disclosure, the activation element is set up in the second position to interrupt the charging connection. In a further method according to the present disclosure, the charging connection is interrupted by the activation element in the second position.

As a result, the control volume is disconnected from the gas pressure source by way of the activation element in dependence on the trigger position such that the gas pressure in the control volume is able to be changed from that of the gas pressure source.

In a further exemplified embodiment of the present disclosure, the tool comprises a main trip valve and the tool comprises a trip element which is set up to interrupt a pneumatic connection, referred to below as a trip connection, from the gas pressure source connection to the main trip valve when the standby element is in the standby position, and wherein by way of the standby element a pneumatic secondary line is provided between the main trip valve and the gas pressure source connection by bypassing the trip element when the standby element is in the safety position. In a further method according to the present disclosure, a trip connection is correspondingly interrupted by way of a trip element of a main trip valve and a pneumatic secondary line is correspondingly provided.

As a result, a trip taking place is pneumatically prevented when the standby element is in the safety position. In contrast, a trip is possible by way of the trip element when the standby element is in the standby position. In a preferred manner, such a secondary line also exists when the standby element is in the standby position and the activation element is not in the activation position. In a preferred manner, the trip element is set up to define a pneumatic trip discharging connection between the main trip valve and a pressure sink (and not only to interrupt the trip connection), when the standby element is in the standby position. As a result, the trip element assumes a double function, as a result of which a compact design is made possible.

In a preferred manner, the trigger element comprises a coupling element which can be acted upon by the workpiece contact element, in a preferred manner in any position of the trip element, and which couples the workpiece contact element mechanically with the trip element.

The trip element, in a preferred manner, is or includes a pin. In a preferred manner, the trip element comprises sealing surfaces (e.g., sealing rings). The trip element comprises in a preferred manner an idle position and a trip position. In a preferred manner, the trip connection is only interrupted when the activation element is in one of its two positions (e.g., the second position or the activation position) and the trip element is in the trip position. As a result, the activation element also has a trip function when it is moved into the corresponding position, insofar as the trip element is already in the trip position. The trip element, in a preferred manner, is part of the trip valve. The trip element, in a preferred manner, comprises a central axial channel. As a result, a venting line is provided for the preferred permanent connection of the volume which is defined by the rear region of the trip valve housing (see below for more concerning the venting line). The trip element, in a preferred manner, is acted upon at one end by way of a spring in the direction of the trigger element. It can be acted upon at (another) end in a preferred manner by way of a coupling element which is movable as a result of movements of the trigger element and of the workpiece contact element.

In a further exemplified embodiment of the present disclosure, the activation element defines part of the trip connection between the gas pressure source connection and the main trip valve.

As a result, a very compact design is made possible.

In a further exemplified embodiment/method of the present disclosure, the trip element is/will be movably guided on the activation element and relative to the activation element.

As a result, a compact design is obtained as the trip element and the activation element interact directly with one another in this manner and no additional guiding parts have to be provided. In a preferred manner, a contour of the activation element or a sealing element (e.g., sealing rings) of the activation element abuts (directly) against a contour of the trip element or against a sealing element (e.g., sealing ring) of the trip element.

In a further exemplified embodiment of the present disclosure, the activation element and a trip element for tripping a main trip valve of the tool, in a preferred manner the already named trip element, are nested in one another and in a preferred manner are concentric.

As a result, the design is very compact, in particular in the axial direction (direction of movement of the activation element and/or standby element and/or trip element). In a preferred manner, an outside contour of the trip element or outer sealing elements (e.g., sealing rings) of the trip element abut (directly) against the inside contour of the activation element or against inner sealing elements (e.g., sealing rings) of the activation element. The activation element, in a preferred manner, is realized as a tube piece and it guides the trip element within itself.

Figure 1B:
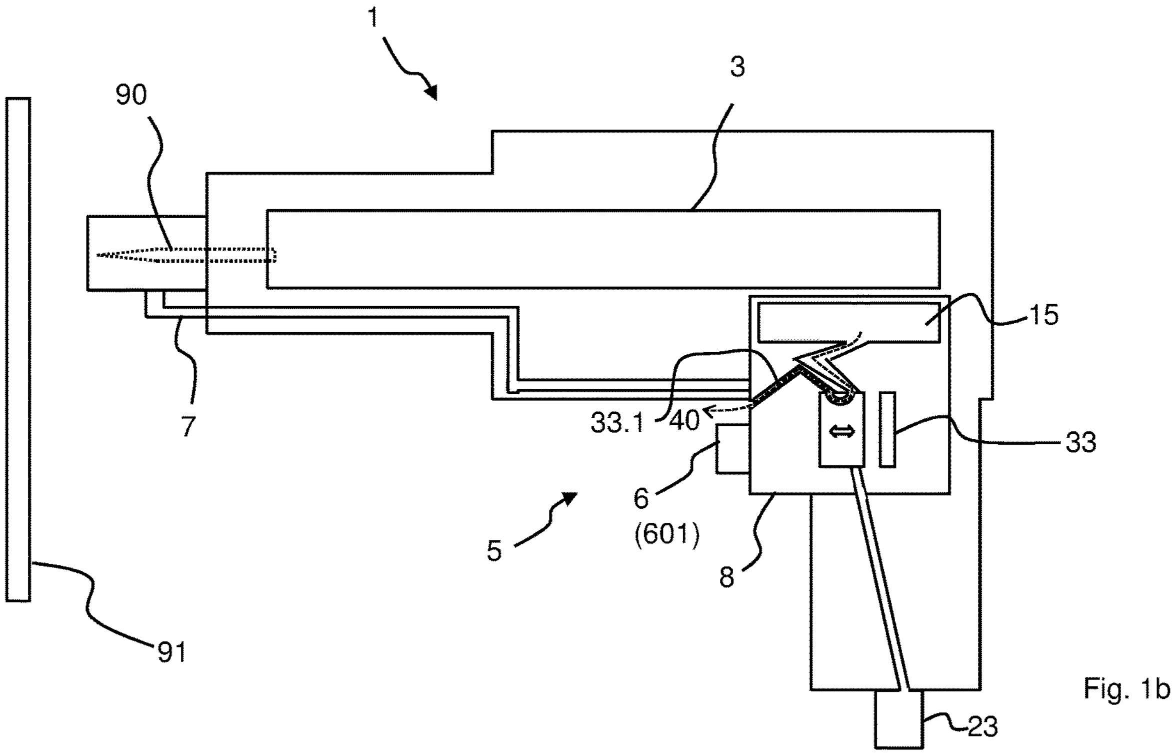
Figure 7:
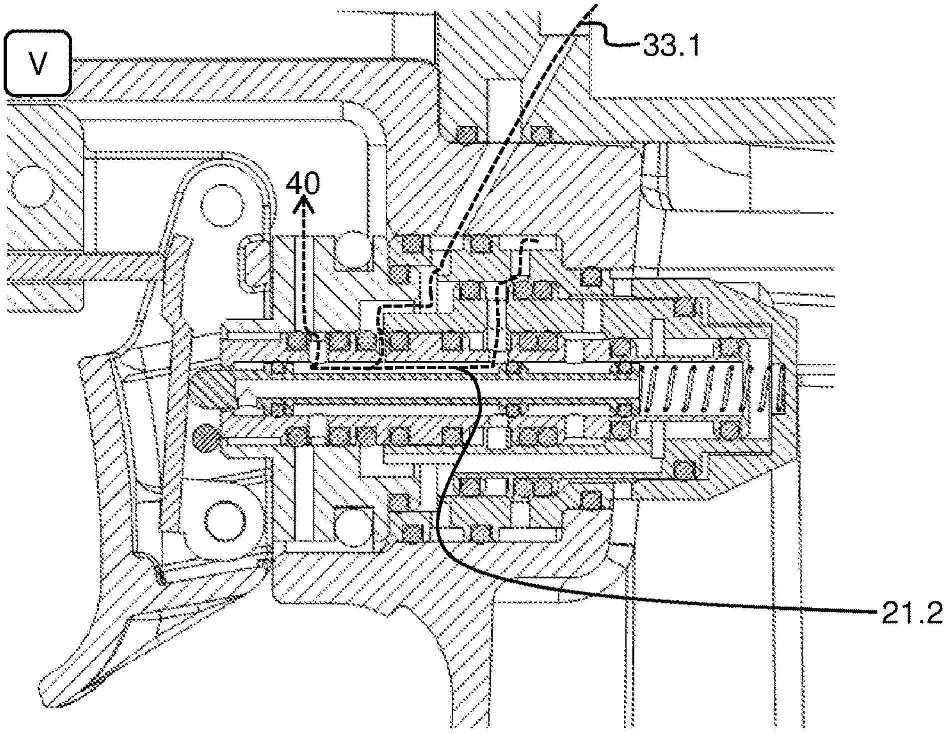
Figure 8:
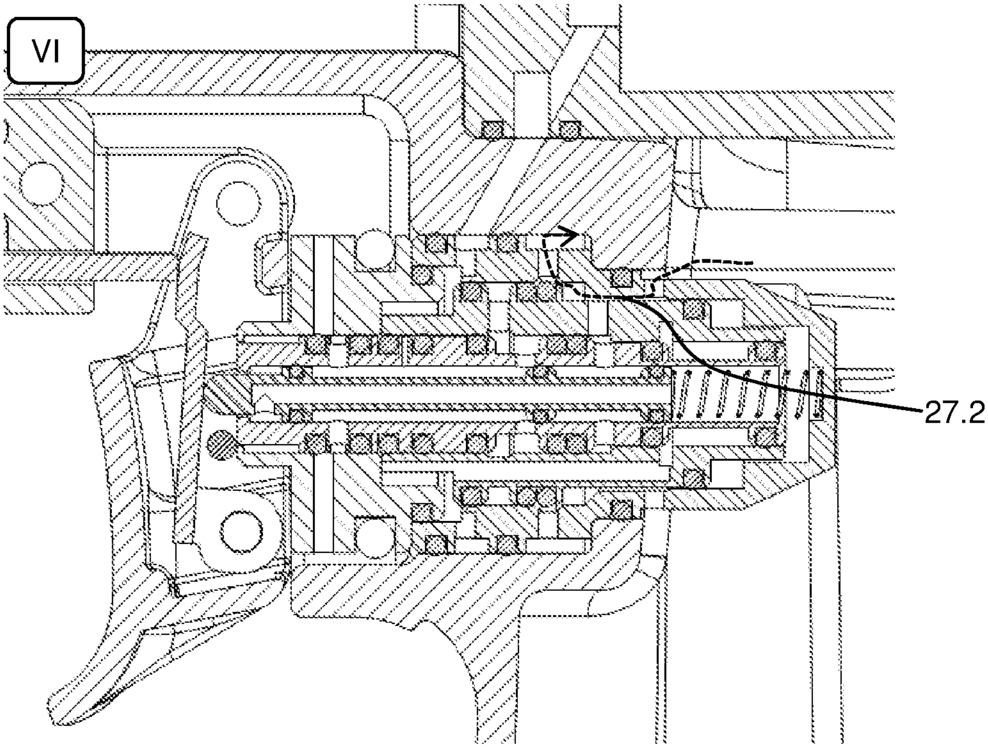
Figure 20:
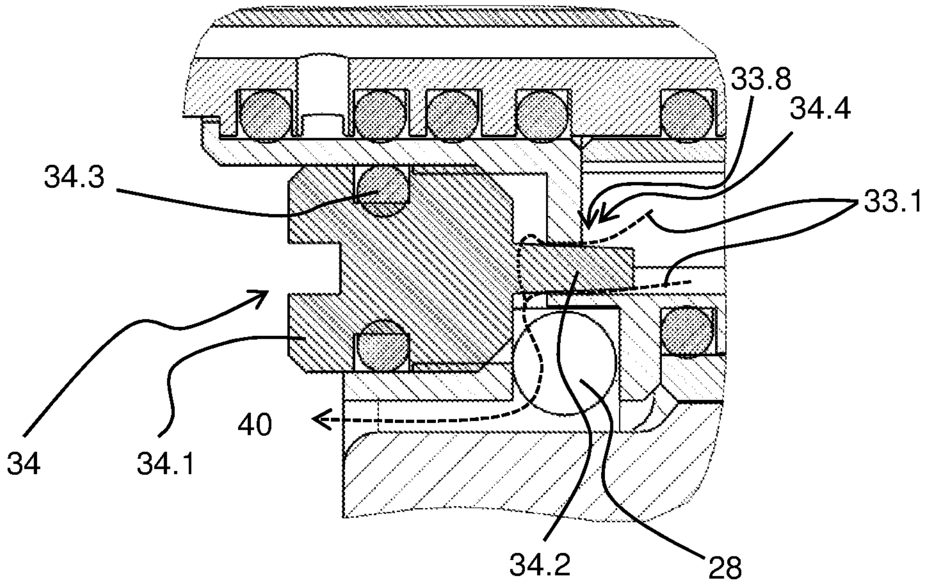
Figure 9:
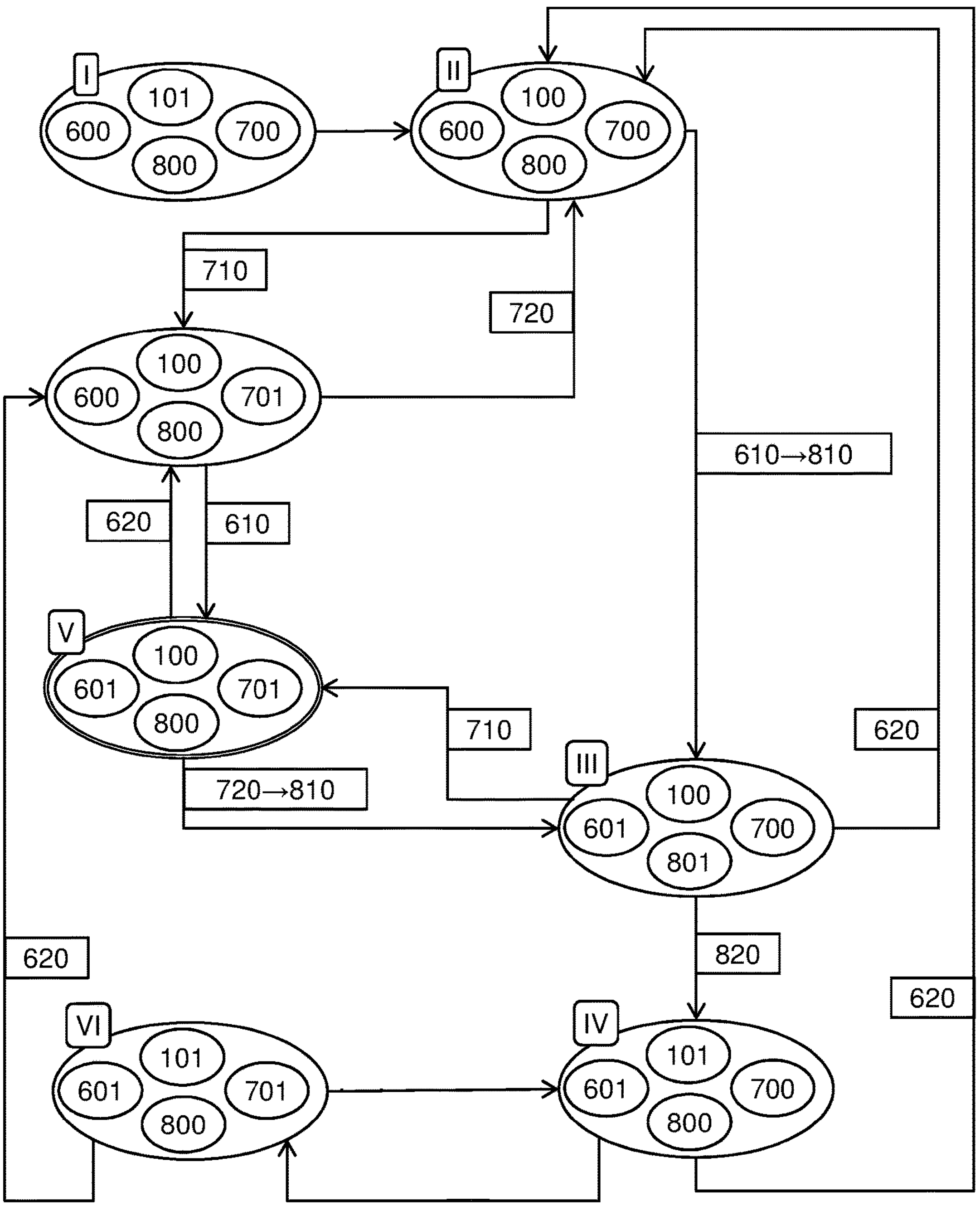
Figure 13:
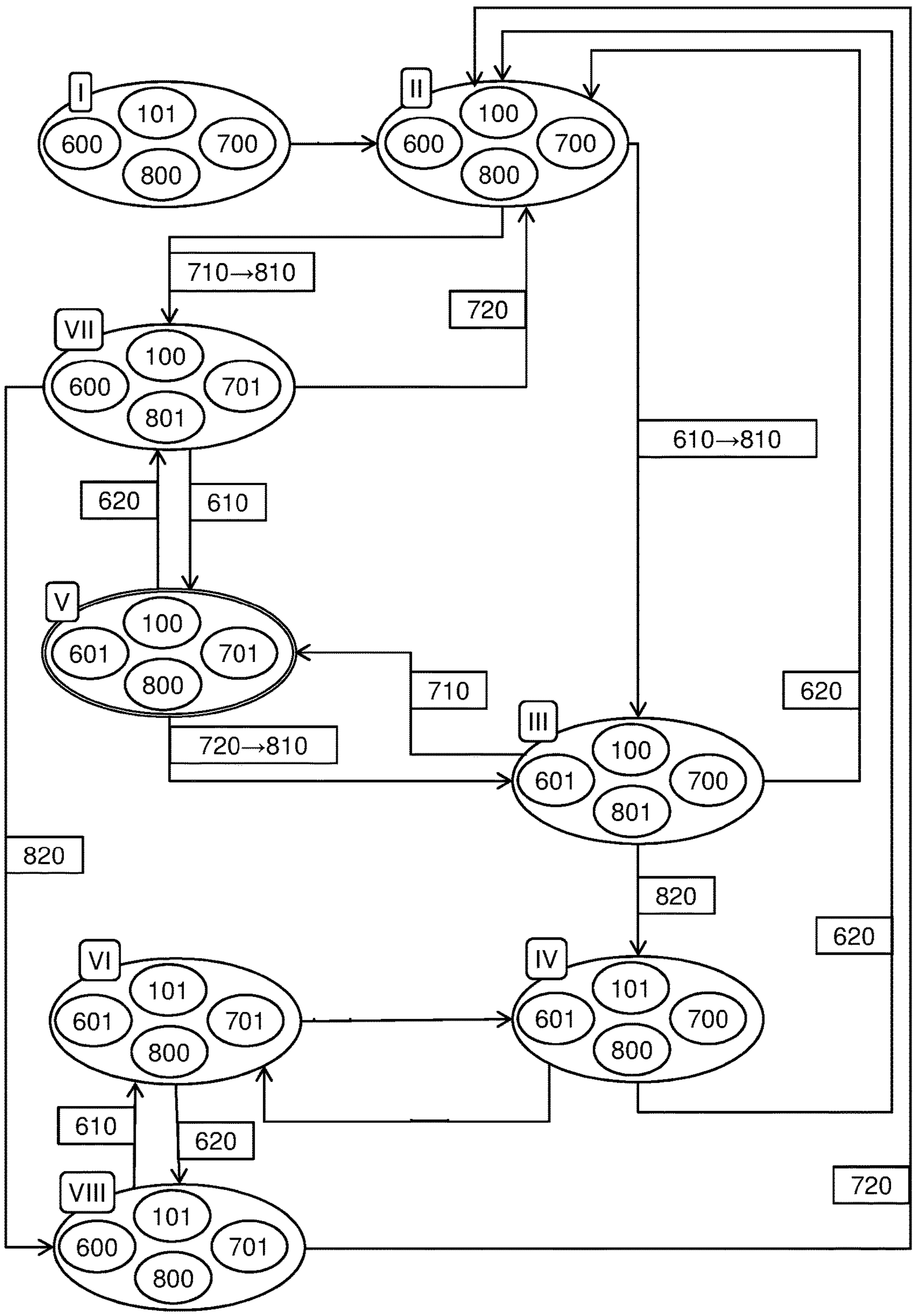
Figure 14:
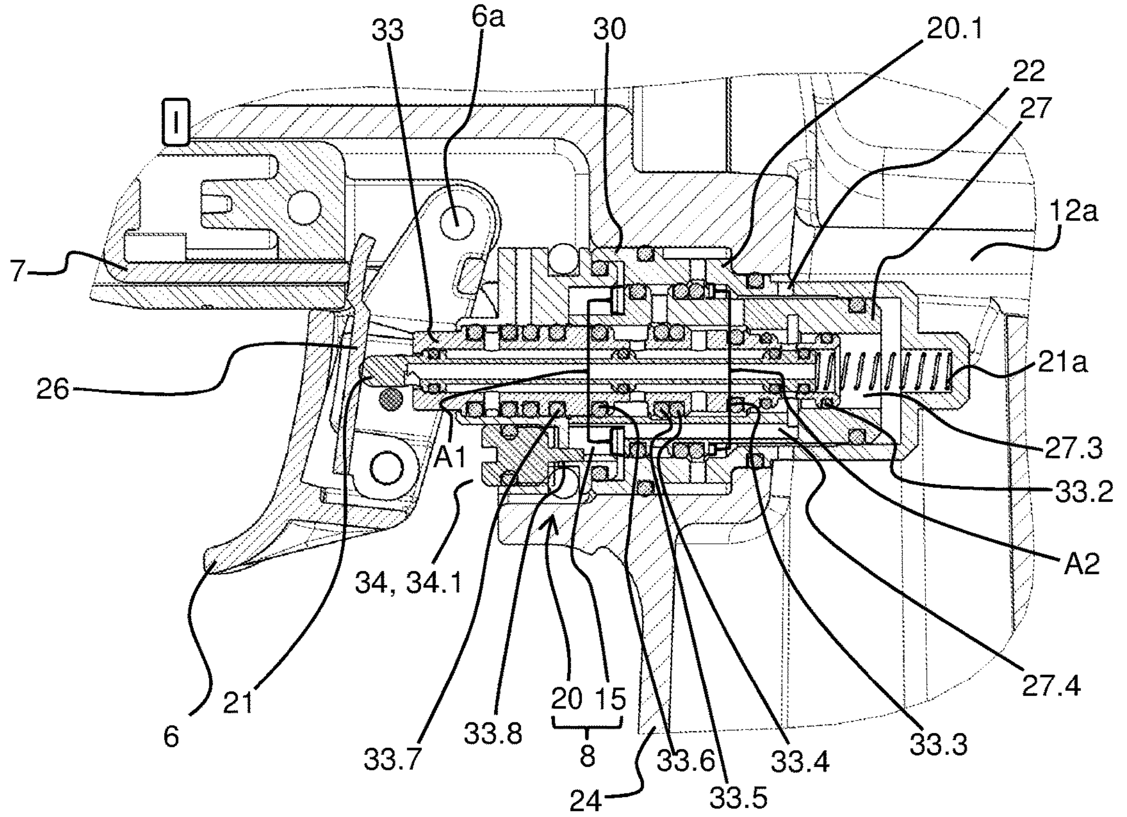
Figure 15:
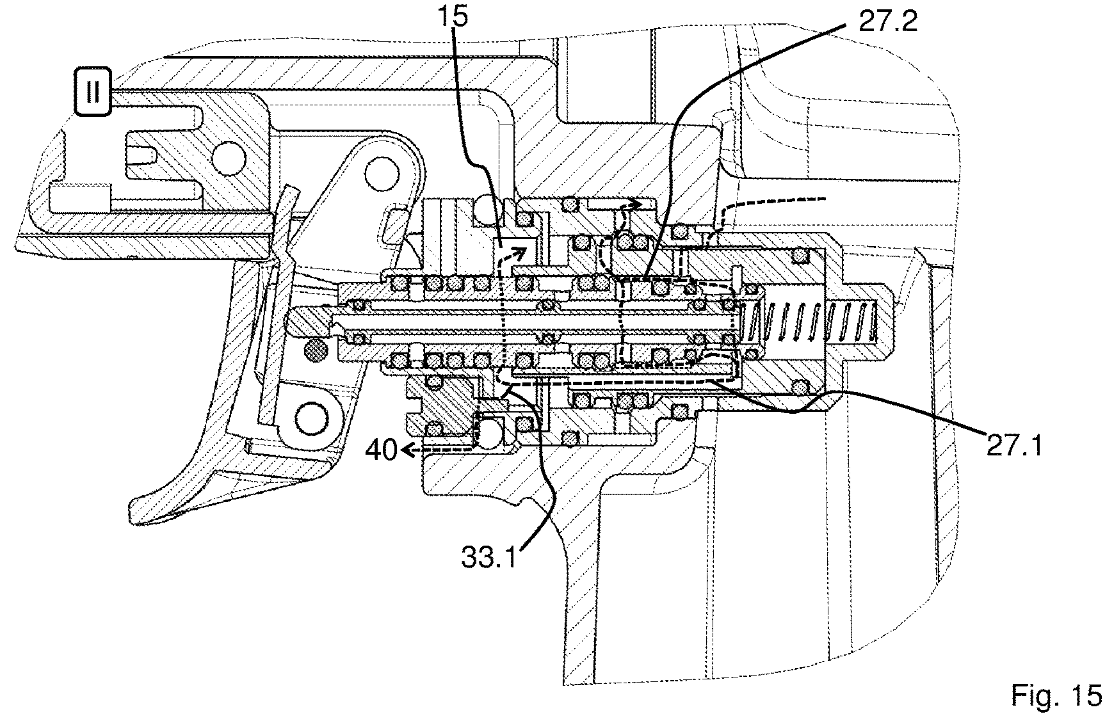
Figure 16:
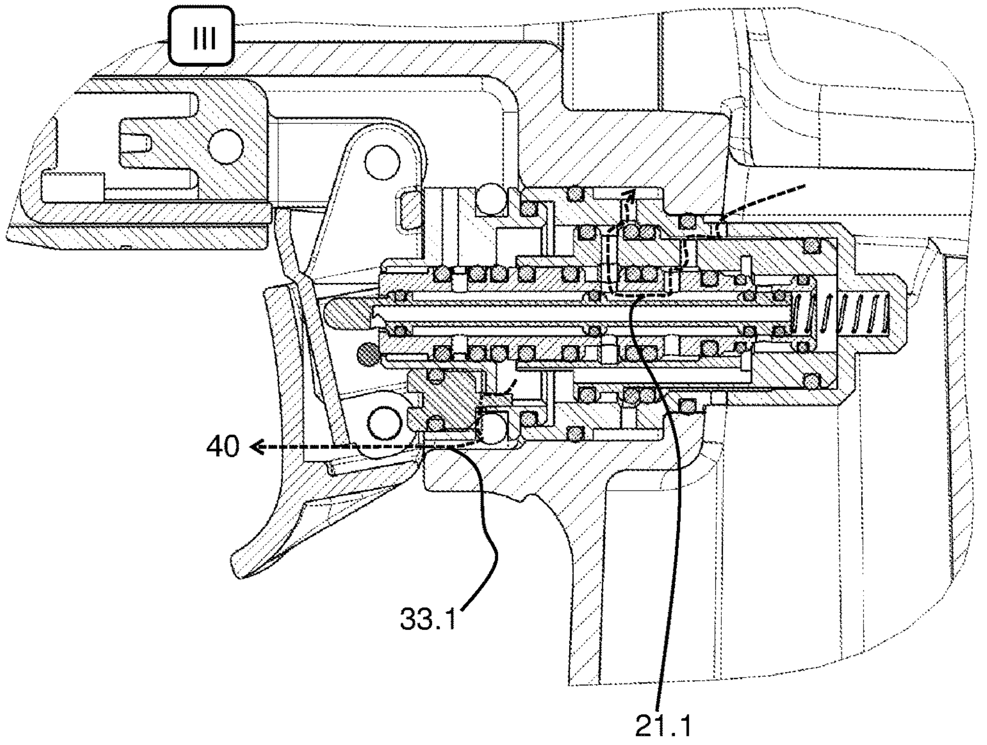
Figure 17:
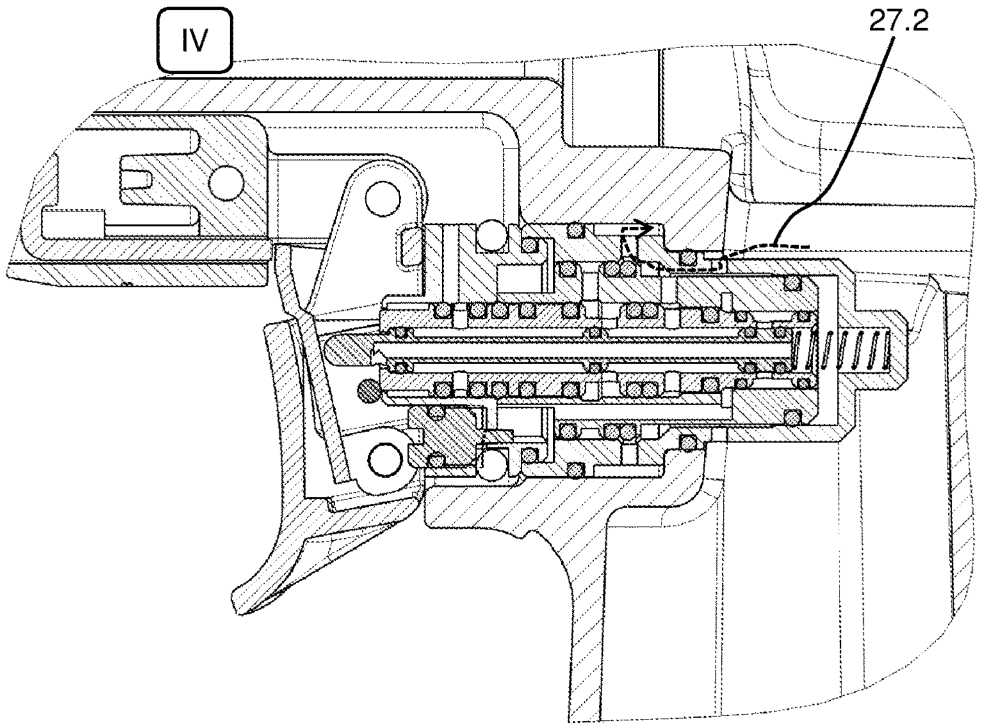
Figure 18:
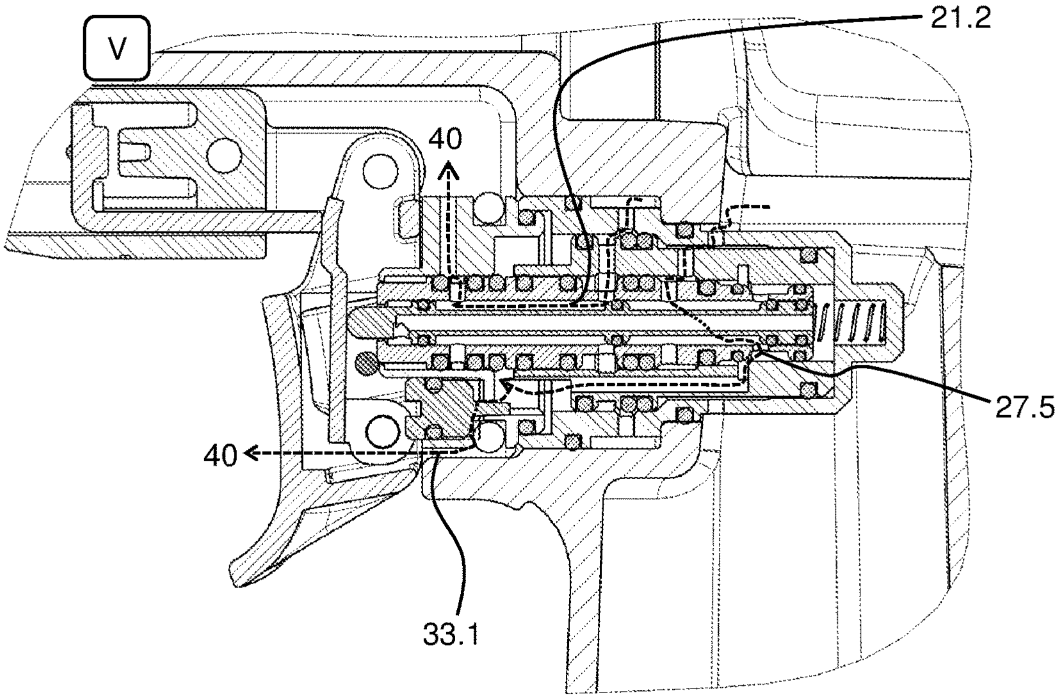
Figure 19:
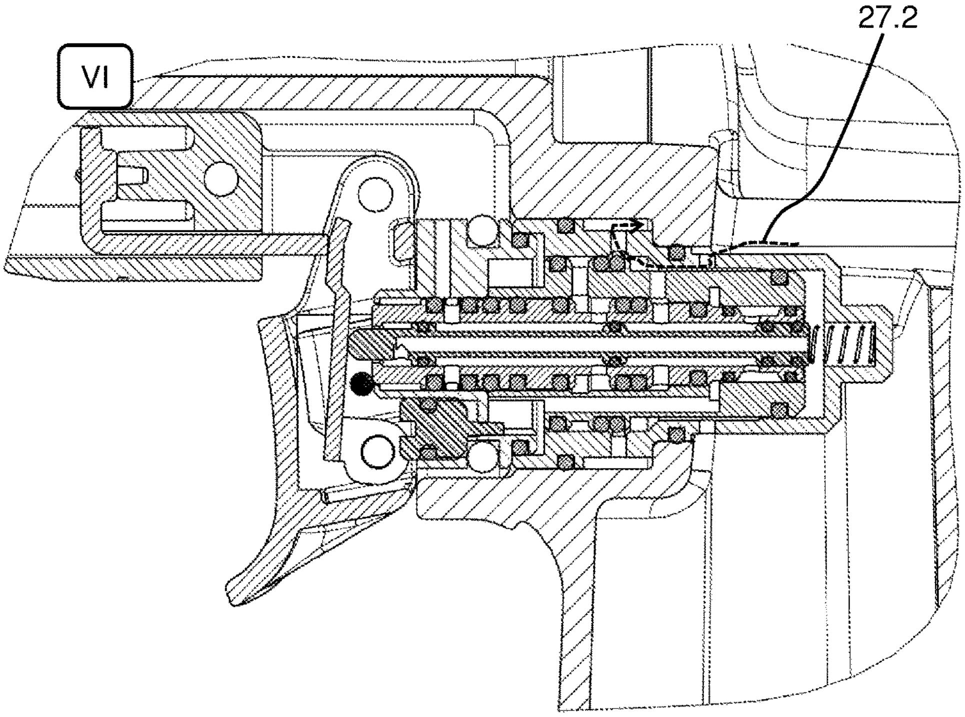

The present disclosure is now to be further illustrated as an example by way of drawings, in which:

FIGS. 1*a* and 1*b* show a schematic diagram of a tool according to one example embodiment of the present disclosure, FIG. 2 to FIG. 8 show sectional representations of an even more preferred example embodiment of a tool based on FIGS. 1*a* and 1*b* in different states, FIG. 9 shows a flow diagram of the use of a further preferred example embodiment of a tool of the present disclosure based on the preceding figures in different states which are shown again in part in the preceding figures, FIG. 10 to FIG. 12 show, building on the preceding figures, a variant example embodiment of the present disclosure in which the activation element is also displaceable by way of the workpiece contact element, FIG. 13 shows a flow diagram for said variant of FIG. 10 to FIG. 12, FIG. 14 to FIG. 20 show a further variant of the present disclosure shown in FIG. 1 to FIG. 9, wherein the control volume 15 is realized by the trip valve 20, FIGS. 21*a* to 24*b* show different arrangements according to the present disclosure of the smallest cross sectional flow area which defines the delay time of the safety device.

FIGS. 1*a* and 1*b* show a schematic diagram of a tool 1 according to one example embodiment of the present disclosure for driving fasteners such as fastener 90 into a workpiece such as workpiece 91. The tool 1 comprises:

- an actuator unit 3, by way of which the fasteners 90 are drivable into the workpiece 91 in drive-in cycles,
- a trip arrangement 5, by way of which the drive-in cycles of the actuator unit 3 are trippable, wherein the trip arrangement 5 comprises a trigger element 6 which is manually operable and comprises an idle state 600 (shown in FIG. 1*a*) and a pressed state 601 (shown in FIG. 1*b*), wherein the trip arrangement 5 additionally comprises a workpiece contact element 7 which is actuatable by placing the drive-in tool 1 onto the workpiece 91,
- a gas pressure source connection 23 to which a gas pressure source is connectable,
- a safety device 8 which is coupled with the trigger element 6 and is set up to bring about a transfer of the drive-in tool 1 from a trip-ready state into a secured state after expiry of a delay time which proceeds from an activation of the safety device 8,
- wherein the safety device 8 comprises a control volume 15,
- wherein the safety device 8 comprises an activation element 33 which is changeable between a first and a second position by way of the trigger element 6.

In the first position of the activation element 33, a pneumatic connection is defined between the control volume 15 and the gas pressure source connection 23, which is hereafter referred to as charging connection 27.1. In the second position of the activation element 33 a pneumatic connection is defined between the control volume 15 and a pressure sink 40, which is hereafter referred to as discharging connection 33.1. One connection from the charging connection 27.1 and the discharging connection 33.1, here the discharging connection 33.1, comprises a smallest cross-sectional flow area 33.8 which, together with a gas pressure of the gas pressure source, determines the delay time of the safety device.

In this case, the safety device 8 of the tool 1 functions as follows. In FIG. 1*a*, the control volume 15 is charged by way of the charging connection 27.1. If the user, proceeding from FIG. 1*a*, presses the trigger 6, the activation element 33 is displaced such that the charging connection 27.1 is disconnected and the discharging connection 33.1 is established (FIG. 1*b*). As a result of the small cross sectional flow area of the discharging connection 33.1, the control volume 15 is discharged slowly, i.e., at the determined delay time. Dependent on the pressure in the control volume 15, the tool 1 is then moved into a trip-ready state or a secured state.

These figures additionally show one preferred development, according to which the correspondingly other connection from the charging connection 27.1 and the discharging connection 33.1, i.e., here the charging connection 27.1, comprises a larger smallest cross sectional flow area than the one connection from the charging connection 27.1 and the discharging connection 33.1, i.e., here the discharging connection 33.1, as a result of which the control volume 15 is able to be charged very rapidly.

In addition, one preferred development is illustrated, according to which the tool 1 comprises a pneumatic line which is both part of the charging connection 27.1 and part of the discharging connection 33.1 and which extends from the activation element 33 toward the control volume 15. In this case, the tool 1 additionally comprises two lines which are separate from one another, wherein one of the lines which are separate from one another is part of the charging connection 27.1 and extends from the activation element 33 toward the gas pressure source connection 23, and the other of the lines which are separate from one another is part of the discharging connection 33.1 and extends from the activation element 33 toward the pressure sink 40. The smallest cross sectional flow area 33.8, which, together with the gas pressure, determines the delay time of the safety device 8, is present in precisely one of the lines which are separate from one another, here in the line which extends from the activation element 33 toward the pressure sink 40. The rapid charging and slow discharging of the control volume 15 is realized structurally in a very advantageous manner as a result.

Further preferred developments are provided herein, namely that the safety device 8 is set up to transfer the tool 1 into the secured state if a pressure threshold in the control volume is fallen below and that the charging connection 27.1 is present when the trigger element 6 is in its idle state 600.

FIG. 2 to FIG. 8 show sectional representations of an even more preferred embodiment of a tool 1 based on FIGS. 1*a* and 1*b* in different states. It has the features described and shown in FIG. 1*a* and FIG. 1*b*.

Provided herein additionally are the following preferred features which are also usually present in the case of a compressed air drive-in tool, but are not absolutely necessary and which also interact well with various features of the present disclosure in an alternative form:

- the trigger element 6 is a trigger lever which is pivotably mounted on a trigger element axis 6*a;*
- the actuator unit 3 comprises an operating cylinder 10 in which is guided an operating piston 11 which moves a drive-in punch 9; and
- a drive volume 13 is present on the side of the operating piston 11 on the other side of the drive-in punch 9.

Figure 2:
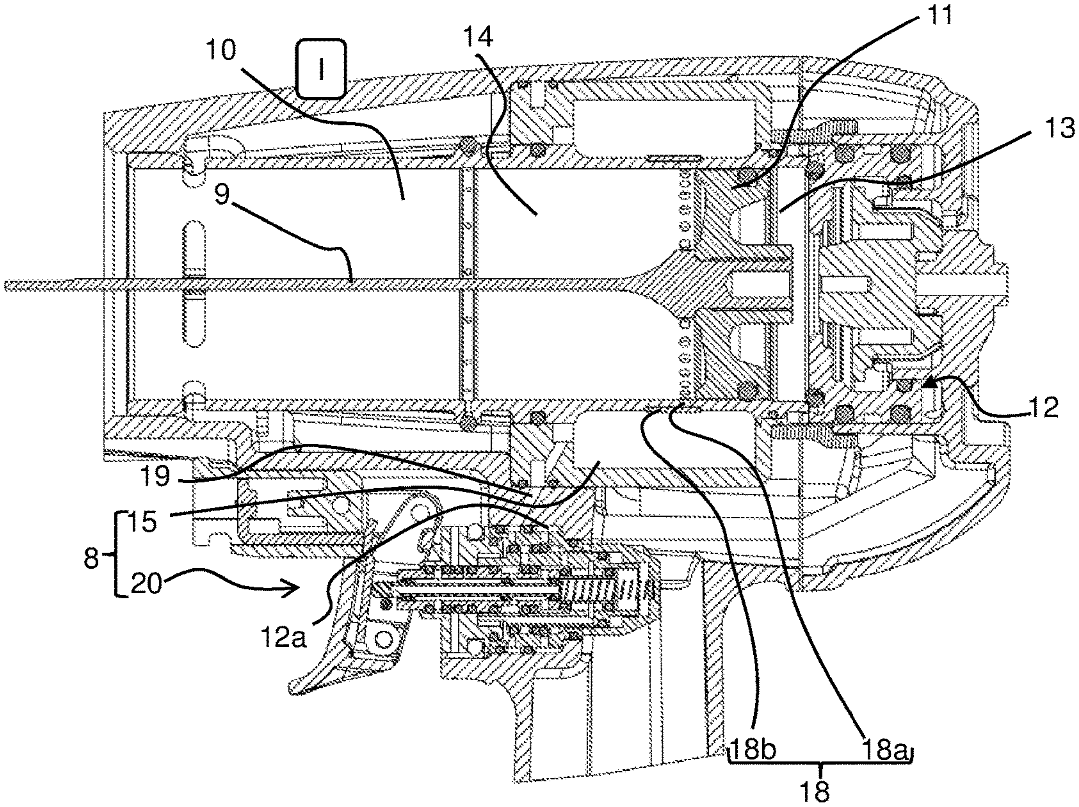
Figure 3:
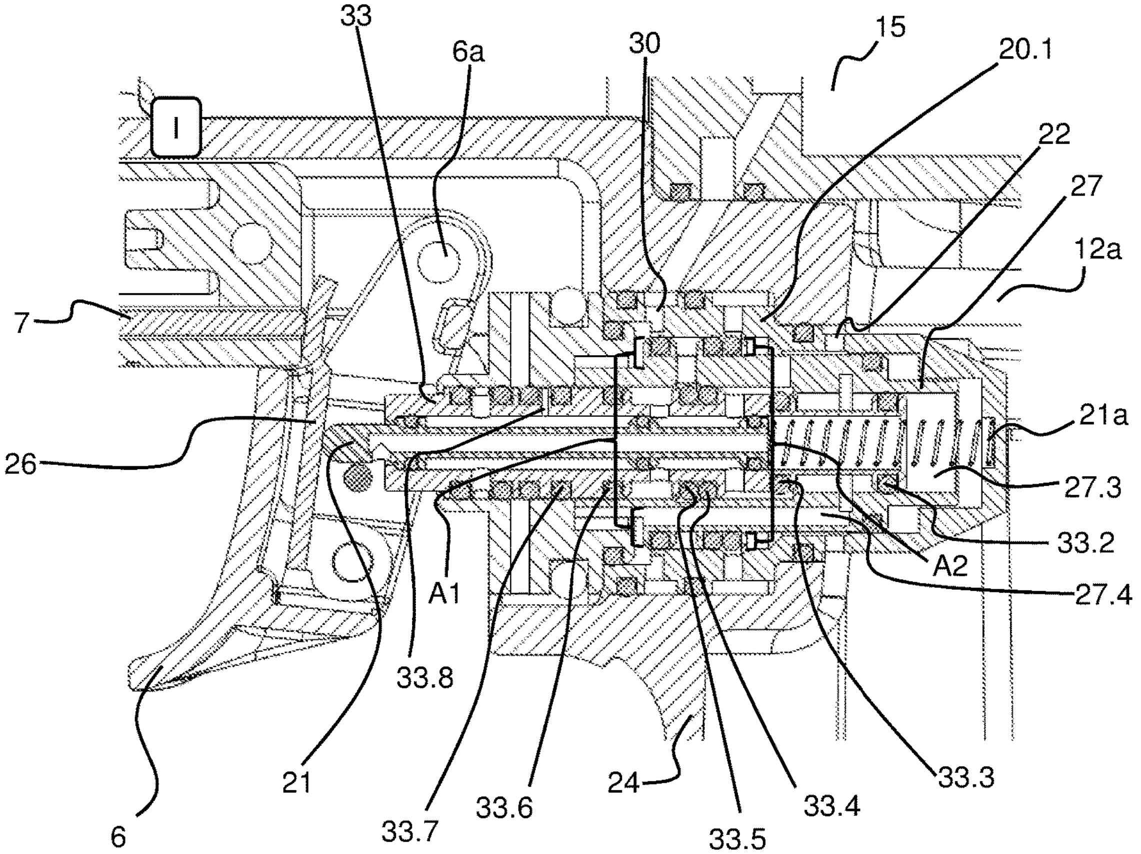
Figure 4:
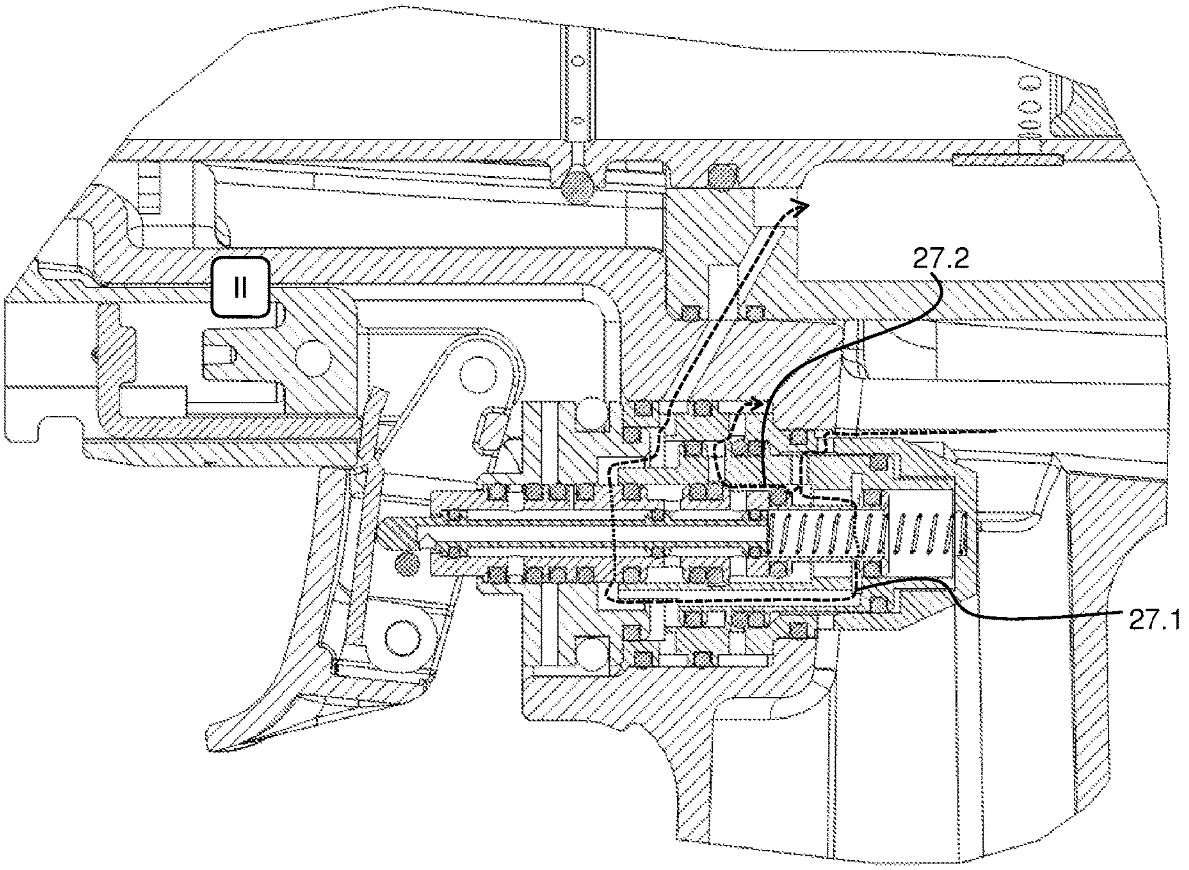
Figure 5:
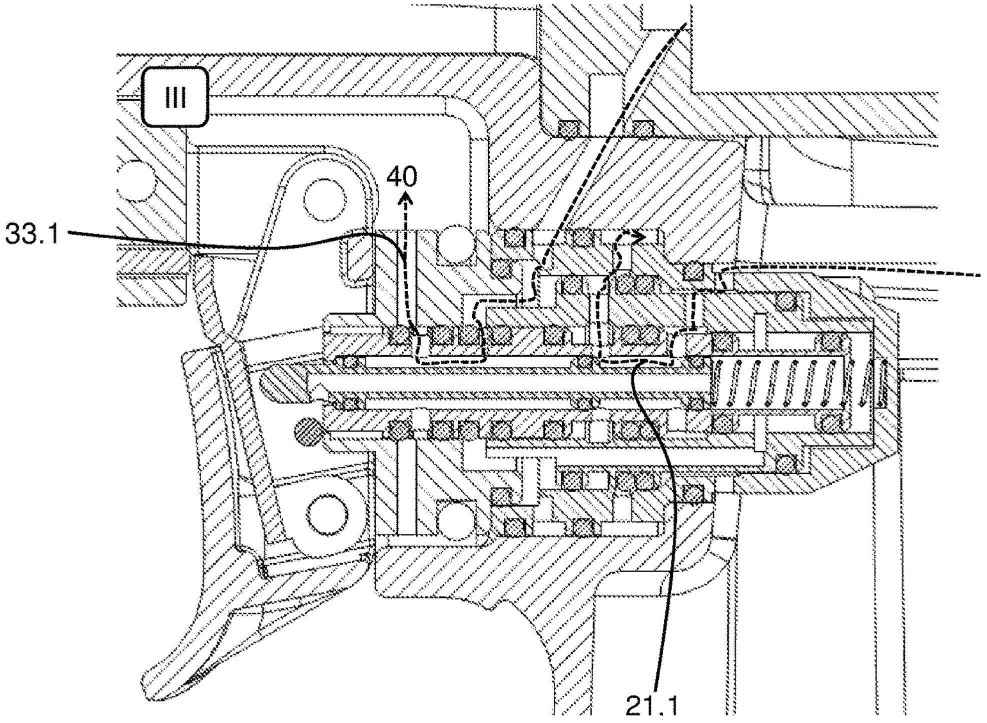
Figure 6:
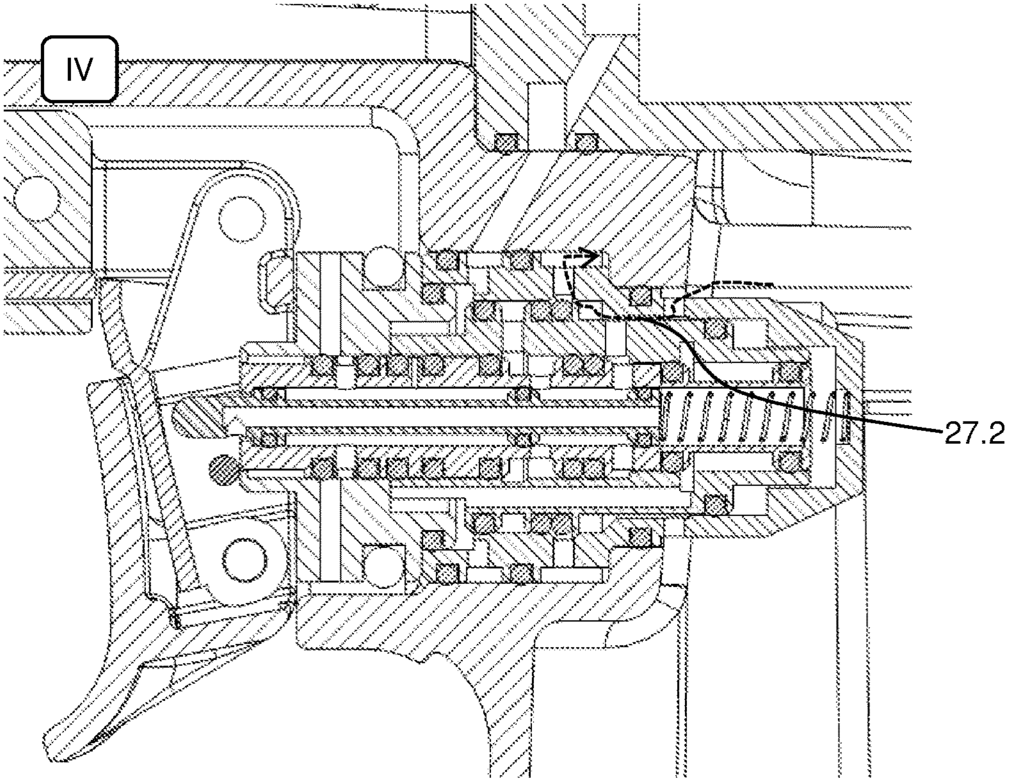

FIGS. 2 and 3 show the tool 1 when the compressed air is not connected, the standby element 27 is situated in the safety position. FIG. 4 shows the tool 1 with the compressed air connected, neither the trigger element 6 nor the workpiece contact element 7 being actuated, and wherein the standby element 27 is situated in the standby position. FIG. 5 shows the tool 1 with the trigger element 6 pressed and with the standby element 27 still in the standby position. FIG. 6 shows the tool 1 after the predetermined time has elapsed and the tool 1 has been transferred into the secured state, wherein the standby element 27 is now situated in the safety position. FIG. 7 shows the tool 1 in the state of tripping a drive-in operation, wherein the standby element 27 in this case is in the standby position. FIG. 8 shows the tool with the trigger element 6 and the workpiece contact element 7 pressed, it being situated in the secured state, and wherein the standby element 27 is situated in the safety position, and consequently wherein no drive-in operation is tripped.

The activation element 33 is resettable pneumatically in the position from its first and second position in which the activation element 33 is situated in the idle state 600 of the trigger element 6. The activation element 33 comprises a positive surface difference between surfaces which are acted upon by gas from the gas pressure source connection less surfaces which are connected to the pressure sink 40.

The safety device 8 comprises a standby element 27 which is displaceable pneumatically into a safety position and a standby position. The tool 1 is situated in the secured state (shown in FIGS. 2, 3, 6, and 8) when the standby element 27 is situated in the safety position, and it is situated in the trip-ready state 100 (shown in FIGS. 4, 5, and 7) when the standby element 27 is situated in the standby position. The standby element 27 is arranged between the control volume 15 and the gas pressure source 23 and the charging connection 27.1 is guided through at least two openings in the standby element 27 (FIG. 4). The standby element 27 comprises a first surface region with a first surface area A1 which can be acted upon by gas pressure from the control volume 15 when the trigger element 6 is in its pressed state 601. It comprises a second surface region with a second surface area A2 which can be acted upon with gas from the gas pressure source when trigger element 6 is in its pressed state 601 and when trigger element 6 is in its idle state 600. The first and the second surface regions are set up to direct opposing displacement forces onto the standby element 27 when acted upon with pressure. They comprise opposing components of surface normals for this purpose. The first and second surface regions are situated in a common pneumatic volume when the activation element 33 is situated in the first position (to the left, or in the position closer to the trigger element) and are situated in two separate volumes when the activation element 33 is situated in the second position (to the right, or further away from the trigger element). The first surface area A1 is greater than the second surface area A2. The standby element 27 is realized as a tube piece which is open at both end faces and comprises a central through channel 27.3. The tube piece comprises, along with the through channel 27.3, an axial secondary channel 27.4 which comprises an opening which faces the through channel 27.3 and one which is at an axial spacing therefrom and faces the outside surrounding area of the tube piece. The secondary channel 27.4 is part of the charging connection 27.1 (FIG. 4). The activation element 33 is guided movably on the standby element 27 and relative to the standby element 27. The activation element 33 and the standby element 27 are nested in one another and are concentric. Outer sealing rings 33.2, 33.3, 33.4, 33.5, 33.6, and 33.7 of the activation element 33 abut directly against the inside contour of the standby element 27. The activation element 33 is also realized as a tube piece. The discharging connection 33.1 extends through two openings in the activation element 33, present in a lateral surface of the activation element 33.1 (FIG. 5). The discharging connection 33.1 is defined in the activation position (second position, on the right) by the activation element 33.

The tool 1 comprises a main trip valve 12 and a trip element 21 which is set up to interrupt a pneumatic trip connection 21.1 (FIG. 5) from the gas pressure source connection 23 to the main trip valve 12 when the standby element 27 is in the standby position. By way of the standby element 27, a pneumatic secondary line 27.2 is provided between the main trip valve 12 and the gas pressure source connection 23 by bypassing the trip element 21 when the standby element 27 is in the safety position (FIG. 6) or when the activation element 33 is in the first position, to the left (FIG. 4). The activation element 33 defines part of the trip connection 21.1 from the gas pressure source connection 23 to the main trip valve 12 (FIG. 5). The trip element 21 is guided movably on the activation element 33 and relative to the activation element 33. The activation element 33 and the trip element 21 are nested in one another. The trip element 21 is set up here to define a pneumatic trip discharging connection 21.2 between the main trip valve 12 and the pressure sink 40.

The trigger element 6 comprises a coupling element 26 which can be acted upon by the workpiece contact element 7 in each position of the trip element 21 and which couples the workpiece contact element 7 and the trigger element 6 mechanically with the trip element 21.

In addition, the following advantageous, optional specifications are shown here:

- in order to enable continuous contact tripping (trigger element 6 held in the pressed state, workpiece contact element 7 actuated repeatedly at short intervals, shorter than the predetermined time), the operating cylinder 10 comprises a ventilation arrangement 18 produced from at least one, here several openings 18*a* in the lateral surface which are covered radially outward (with reference to the operating cylinder 10) by way of a resilient sealing ring 18*b* which acts as a one-way valve; the ventilation arrangement 18 is arranged in a portion 14 of the operating cylinder 10 which is located on the other side of the drive volume 13 in the idle position with reference to the operating piston 11; compressed air is directed into the control volume in this way via the openings 18*a* as a result of a drive-in operation; the countdown of the safety device 8 is reset in this way even when the trigger element 6 is kept continuously pressed;
- elements (in particular 27, 33, and 21) of the safety device 8 are combined as a trip valve 20 of the trip arrangement 5, the trip valve 20 being arranged in a preferred manner in the handle portion 24 of the tool 1—in this respect the trip valve 20 itself can also be viewed as part of the safety device 8; the trip valve comprises a housing 20.1 in which the standby element 27 is displaceably mounted with sealing elements, here sealing rings; the activation element 33 and the trip element 21 are additionally accommodated in the housing 20.1; a pneumatic line 12*a* leads from the trip valve 20 to the main trip valve 12 (only the start of said line can be seen here at the trip valve 20, the rest of the line 12*a* is concealed); a valve inlet 22 is present in the housing 20.1 on the gas source side and a valve inlet 30 on the control volume side; between the valve inlet 30 on the control volume side and the control volume 15 there is a ventilation/venting line, by way of which the control volume 15 is able to be ventilated or vented by way of the trip valve 20;
- a trip element spring 21*a* pre-stresses the trip element 21 into its idle position (to the left).

FIG. 9 shows a flow diagram of the use of the further preferred embodiment of a tool based on the preceding figures in different states which are shown in part in the preceding figures (cross-referenced by Roman numerals). In each case states are shown in circles and events in squares.

In state I, the tool 1 is not connected to the gas pressure source. Consequently, the tool is situated in the secured state 101. The trigger element 6 is situated in the idle state 600 and the workpiece contact element 7 is in the non-actuated state 700. The safety device 8 is not active, i.e., a time counter is not running. In said state, the standby element 27 can be situated either in the safety position (left position) or in the standby position (right position).

In the state II, the tool 1 is then in use by connecting 230 it to the gas pressure source, as a result of which the instrument assumes the trip-ready state 100. In this case, the standby element 27 (unless it was not already situated there in state I) is moved into its standby position. This is brought about by the surface difference between the surface regions A1 and A2 which, in said state, are both acted upon by the pressure from the gas pressure source. The control volume 15 is "charged" with gas pressure via the charging connection 27.1. In addition, in said state there is a secondary line 27.2 which bridges the trip element 21. The secondary line 27.2 is consequently a connection, which cannot be interrupted by the trip element 21, from the gas pressure source connection 23 to the main trip valve 12.

Proceeding from said state II, by actuating 710 the workpiece contact element 7 (e.g., placing and pressing the tool tip onto a workpiece) a next sequence state can be achieved (on the left, second line) where the workpiece contact element 7 is then situated in its actuated state 701.

Proceeding from said state, by actuating 610 the trigger element 6, the state V is achieved or by raising 720 the workpiece contact element 7 state II is resumed.

In the state V, a drive-in cycle is tripped (indicated by the double border). The trigger element 6 is situated in the pressed state 601 and the workpiece contact element 7 in the actuated state 701. The trip element 21 is in its trip position, which is achieved by way of the coupling element 26. By both the trigger element 6 and the workpiece contact element 7 in said state V being situated in their actuated or pressed states in each case, the trip connection 21.1 is established from the main trip valve 12 to the pressure sink 40 such that the main trip valve 12 is activated and the drive-in operation is carried out. In this case, the drive volume 13 is acted upon with the gas pressure from the gas pressure source such that the operating piston is moved in the direction of the tool tip (to the left). It passes the ventilation arrangement 18, as a result of which the control volume 15 is also acted upon with gas pressure from the gas pressure source via the openings 18*a*. From said state V, the previous state is achieved by releasing 620 the trigger element 6 (on the left, second line) or the state III is achieved by raising 720 the workpiece contact element 7. The raising 720 simultaneously initiates an activation 810 of the safety device 8, as a result of which a countdown starts for displacing the tool 1 into the secured state 101. For by way of the raising 720, the operating piston 11 is moved into its idle position again such that the control volume 15 is then no longer able to be charged by way of the ventilation arrangement 18—the resilient ring, in this case, prevents discharging in the direction of the operating cylinder 10. As the trigger element 6 is pressed 601, and consequently the discharging connection 33.1 is established, the pressure in the control volume 15 is gradually reduced, i.e., the countdown is running and the safety device 8 is activated.

In the state III, by actuating 610 the trigger element 6 the state II is additionally achieved, as a result of which the safety device 8 is also activated and consequently a countdown to displace the tool 1 into the secured state 101 is started. The control volume 15, in this case, has been charged by the charging connection 27.1 in the state II and is then slowly discharged by way of the discharging connection 33.1.

In the state III, the control volume 15 is separated from the gas pressure source (whilst, for example, in state II a connection has existed between the same via the charging connection 27.1) and air escapes via the discharging connection 33.1 such that the standby element 27 moves abruptly in the direction of the safety position once a certain time has elapsed.

If the trigger element 6 is then released 620, state II is resumed. In this case, the control volume 15 is reconnected to the gas pressure of the gas pressure source and the charging connection 27.1 and the discharging connection 33.1 are separated. The standby element 27 is displaced back into the standby position and remains there.

If, on the other hand, the workpiece contact element 7 is actuated 710, the state V is resumed and a drive-in cycle takes place. The actuation 710 causes the trip element 20 to be displaced into the trip position (right position) by way of the coupling element 26 such that the trip connection 21.2 is re-established.

If, in contrast, state III is maintained longer than the predetermined time, i.e., an elapsing 820 of the predetermined time is expected, the state IV is achieved.

In the state IV, the standby element 27 has arrived in the safety position (left position). The standby element 27 in said position allows for a secondary line 27.2 which connects the main trip valve 12 to the gas pressure of the gas pressure source such that, irrespective in which position the trip element 21 or the activation element 33 are situated, it is not possible to interrupt said connection. An interruption would be possible, however, in order to trip a drive-in operation. Consequently, tripping is impossible and consequently the tool 1 is situated in the secured position 101. Activation 710 of the workpiece contact element 7, which leads into the state VI and displaces the trip element into its trip position, cannot produce any tripping either as the secondary line 27.2 is defined by the standby element 27. In order to get out of the secured state 101 again, the user has to release 620 the trigger element 6. Thus the state IV is left and the state II is resumed or the state VI is left and the state which is shown in the second line on the left is resumed. By releasing 620 the trigger 6, the control volume 15 is reconnected to the gas pressure source and the standby element 27 is displaced into the standby position, as the activation element 33 is displaced pneumatically back again into the left position when the trigger 6 is released and then the charging connection 27.1 is re-established.

FIG. 10 to FIG. 12 show, building on the preceding figures, a variant in which the activation element 33 is also displaceable by way of the workpiece contact element 7. The workpiece contact element 7 is coupled mechanically with the activation element 33 in such a manner that the workpiece contact element 7 is able to press the activation element 33 into the activation position (right position); said state is shown in FIGS. 11 and 12, the standby element 27 being situated in the standby position in FIG. 11 and in the safety position in FIG. 12. Said additional mechanical coupling with the activation element 33 is indicated here as an example and in a rough manner by way of an angled region of the workpiece contact element 7. The workpiece contact element 7 is set up in the same way as previously to press the trip element 21 by way of the coupling element 26. Only if both elements from the trigger element 6 and the workpiece contact element 7 are not actuated or are in the idle state is the activation element 33 able to move out of the activation position.

FIG. 13 shows a flow diagram for said variant in FIGS. 10 to 12, once again states being referenced with Roman numerals—the states II—VI, in this case, can be taken from FIGS. 2 to 8, just the changed mechanical coupling between the activation element 33 and the workpiece contact element 7 providing a difference, the state otherwise, however, being the same. The sequence builds on the sequence shown in FIG. 9; in contrast to this, the safety device 8 is now already activated by way of actuating 710 the workpiece contact element 7 such that it is now situated in the activated state 801 in the state VII, for the activation element 33 is displaced by the workpiece contact element 7 into the activation position, left position, such that the discharging connection 33.1 is established. Consequently, it is possible for the predetermined time to run out 820 already from state VII and the tool is transferred into the secured state 101, which leads overall to the state VIII which is new compared to FIG. 9, as now a secured state 101 can also be achieved when the trigger element 6 is situated in the non-pressed state 600. Another difference is that it is now no longer possible proceeding from the state VI by releasing 620 the trigger element 6 for the tool to be transferred back into a trip-ready state 100, for, as a general rule, it is only possible to transfer into the trip-ready state 100 when both the trigger element 6 and the workpiece contact element 7 are moved into the non-actuated or non-pressed state.

FIG. 14 to FIG. 20 show a variant according to the present disclosure of the tool according to the present disclosure shown in FIG. 1 to FIG. 9, in contrast thereto the control volume 15 being realized by the trip valve 20. Otherwise the states marked in FIG. 14 to FIG. 19 with Roman numerals also correspond to the states in FIGS. 2 to 9 and also the flow diagram in FIG. 9 retains its validity. In addition, it is possible to provide the modification according to FIGS. 10 to 12 also for said variant, i.e., the activation element 33 is also displaceable just by way of the workpiece contact element 7 and consequently the flow diagram from FIG. 13 is to be used.

In comparison with preceding variants there are the following differences:

the control volume 15 is reduced to the region also already present previously inside the trip valve housing 20.1 which adjoins the surface region A1. No separate volume adjoining the drive-in piston 10 is necessary and consequently no special valve inlet 30 on the control volume side and no ventilation arrangement 18 arranged on the operating cylinder 10 either. As these are not present, as a rule, in the case of existing former tool housings, on account of said trip valve 20 former tool housings are easily able to be retrofitted with the safety device 8.

The trip valve 20, when the tool 1 is situated in the trip-ready state 100 and the trigger element 6 is situated in the pressed state 601 and at the same time the workpiece contact element 7 is actuated (see FIG. 18, state V), then defines a pneumatic connection. Said connection is a further charging connection 27.3 between the control volume 15 and the gas pressure source connection 23, as the discharging connection 33.1 comprises the smallest cross sectional flow area 33.8. The control volume 15 is filled with pressure again by way of said charging connection 27.3, as a result of which the elapsed delay time is reset. I.e., each time a drive-in operation is tripped (corresponds to state V) the safety device 8 is reset again in this way directly by way of the trip valve 20.

The discharging connection 33.1, which also comprises the smallest cross sectional flow area 33.8, is present both in the first position of the activation element 33 and in the second position of the activation element 33. In addition, the smallest cross sectional flow area 33.8 is variable by way of an adjusting needle 34.1 which forms a needle valve 34 and the cross sectional flow area is consequently very finely adjustable. The needle valve 34 is shown in detail in FIG. 20. The adjusting needle 34.2 is arranged on an adjusting screw 34.1. The adjusting screw 34.1 is screwed into a suitable thread of the housing 20.1 such that the adjusting needle 34.2 projects into an opening of the housing 20.1, the cross sectional flow area of which is consequently variable as a result of rotating the adjusting screw 34.1. A preferred anti-twist ring 34.3 protects the adjusting screw 34.3 from unwanted rotation. After the needle valve 34 in a groove, the gas then escapes past a dowel pin 28, by way of which the trip valve housing is secured in the tool housing, to the atmosphere (pressure sink 40)—this is only indicated here as in said drawing plane the dowel pin 28 fills out the groove for the dowel pin in a substantial manner, which, however, is not so in another drawing plane, as a result of which sufficient space is then provided there for the air flow.

FIGS. 21*a* to 24*b* show schematic diagrams of arrangements according to the present disclosure of the smallest cross sectional flow area which defines the delay time of the safety device. These are in each case pairs of figures (a and b), in the respective figure b the activation element 33 being shown in the activation position, i.e., in the position in which the delay time starts to run down. The other position of the activation element 33 is then shown in the respective figure a.

Figure 21A:
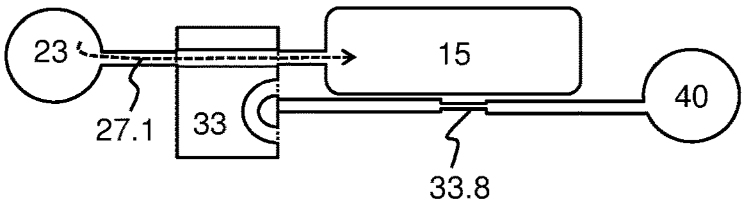
Figure 21B:
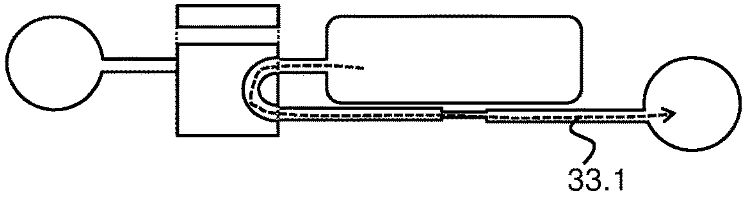
Figure 22A:
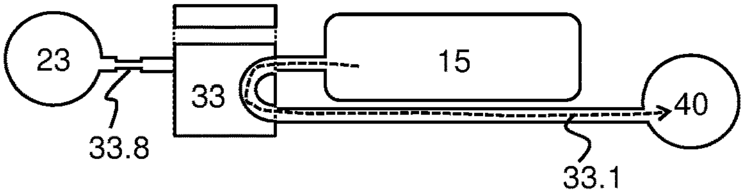
Figure 22B:
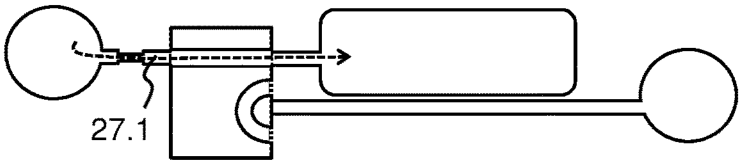
Figure 23A:
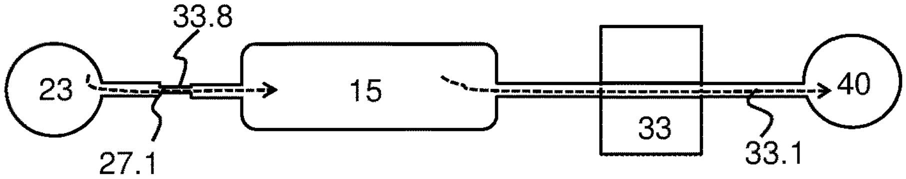
Figure 23B:
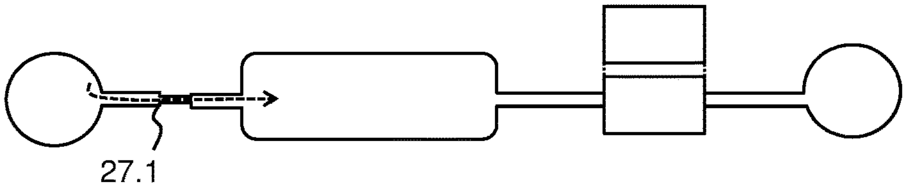
Figure 24A:
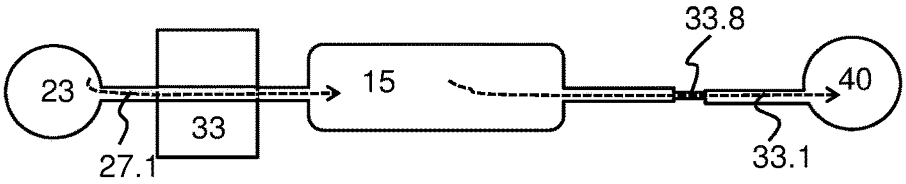
Figure 24B:
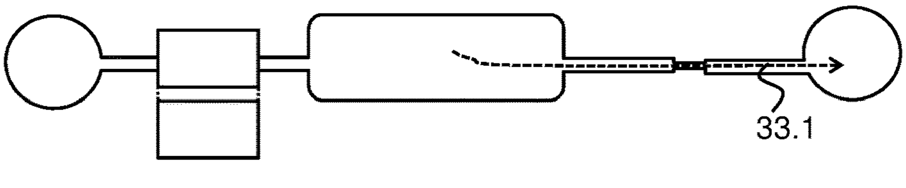

The smallest cross sectional flow area 33.8, which, together with the gas pressure, determines the delay time of the safety device 8, is arranged in precisely one of the following pneumatic connections:

in a pneumatic connection between the activation element 33 and the gas pressure source connection 23—as is shown in FIGS. 22*a/b;* in a pneumatic connection between the activation element 33 and the pressure sink 40—as is shown in FIGS. 21*a/b* and FIGS. 1 to 13;

in a pneumatic connection which exists in both the first position and the second position of the activation element 33 between the control volume 15 and the gas pressure source connection 23—as is shown in FIGS. 23*a/b;* in a pneumatic connection which exists in both the first position and the second position of the activation element 33 between the control volume 15 and the pressure sink 40—as is shown in FIGS. 24*a/b* and FIGS. 14 to 20.

As a result, by way of the said arrangements in which in each case the smallest cross sectional flow area 33.8 is not located in a region which is utilized in a line portion which is common to a charging connection 27.1 and a discharging connection 33.1, rapid resetting of the pressure in the control volume 15 is made possible by releasing the trigger element 6 such that the tool 1 is also rapidly transferable (quicker than the delay time) from the secured state 101 into the standby state 100 again. FIGS. 22*a/b* and 23*a/b* show configurations where the safety device 8 transfers the tool 1 into the secured state 101 when a pressure threshold in the control volume 15 is exceeded, whilst FIGS. 21*a/b* and FIGS. 24*a/b* along with FIGS. 1 to 20 show configurations where the safety device 8 transfers the tool 1 into the secured state 101 when a pressure threshold in the control volume 15 is fallen below.

LIST OF REFERENCES

1 Drive-in tool
3 Actuator unit

5 Trip arrangement
6 Trigger element
6*a* Trigger element axis
7 Workpiece contact element
8 Safety device
9 Drive-in punch
10 Operating cylinder
11 Operating piston
12 Main trip valve
12*a* Line to the main trip valve
13 Drive volume
14 The portion of the operating cylinder located on the other side of the drive volume with reference to the operating piston
15 Control volume
18 Ventilation arrangement
18*a* Openings
18*b* Resilient ring
19 Ventilation/venting line
20 Trip valve
20.1 Housing
21 Trip element
21.1 Trip connection
21.2 Trip discharging connection
21*a* Trip element spring
22 Valve inlet on the gas source side
23 Gas pressure source connection
24 Handle portion
26 Coupling element
27 Standby element
27.1 Charging connection
27.2 Secondary line
27.3 Central through channel
27.4 Axial secondary channel
27.5 Further charging connection
28 Dowel pin
30 Valve inlet on the control volume side
33 Activation element
33.1 Discharging connection
33.2, 33.3, 33.4, 33.5, 33.6, 33.7 Sealing rings of the activation element
33.8 Smallest cross sectional flow area which, together with the gas pressure of the gas pressure source, determines the delay time of the safety device
34 Needle valve
34.1 Adjusting screw
34.2 Adjusting needle
34.3 Anti-twist ring
34.4 Needle opening
40 Pressure sink
90 Fasteners
91 Workpiece
100 Trip-ready state of the tool
101 Secured state of the tool
230 Connect to an energy source
600 Idle state of the trigger element
601 Pressed state of the trigger element
610 Actuate the trigger element from the idle state to the pressed state
620 Actuate the trigger element from the pressed state to the idle state
700 Non-actuated state of the workpiece contact element
701 Actuated state of the workpiece contact element
710 Actuate the workpiece contact element
720 Raise the workpiece contact element from the workpiece
800 Inactive safety device
801 Active safety device
810 Activate the safety device
820 Automatic elapsing of the predetermined time
A1 First surface content
A2 Second surface content

The invention claimed is:

1. A method of operating a drive-in tool including a workpiece contact element, a trigger, a control volume, a gas pressure source connection, and a pressure sink, said method comprising:
- charging the control volume with air pressure via a pneumatic charging connection between the control volume and the gas pressure source connection; and
- after the workpiece contact element is actuated via engagement with a workpiece and after the trigger is actuated:
  - disconnecting the pneumatic charging connection between the control volume and the gas pressure source connection,
  - causing the drive-in tool to be in a trip-ready state,
  - discharging the air pressure in the control volume via a pneumatic discharging connection between the control volume and a pressure sink, and
  - after the gas pressure in the control volume falls below a gas pressure threshold, causing the drive-in tool to switch from the trip-ready state to a secured state.

2. The method of claim 1, wherein disconnecting the pneumatic charging connection between the control volume and the gas pressure source connection includes moving an activation element.

3. The method of claim 2, which includes a first pneumatic line that extends from the activation element toward the gas pressure source connection and a second pneumatic line that extends from the activation element toward the pressure sink, and which includes controlling an amount of time that the drive-in tool is in the trip-ready state via only one of the first pneumatic line and the second pneumatic line.

4. The method of claim 1, wherein disconnecting the pneumatic charging connection between the control volume and the gas pressure source connection includes moving an activation element coupled to the trigger.

5. The method of claim 1, wherein disconnecting the pneumatic charging connection between the control volume and the gas pressure source connection includes moving an activation element coupled to the workpiece contact element.

6. The method of claim 1, wherein disconnecting the pneumatic charging connection between the control volume and the gas pressure source connection includes moving an activation element coupled to the trigger and the workpiece contact element.

7. The method of claim 1, wherein discharging the air pressure in the control volume includes moving an activation element.

8. The method of claim 1, wherein discharging the air pressure in the control volume includes moving an activation element coupled to the trigger.

9. The method of claim 1, wherein discharging the air pressure in the control volume includes moving an activation element coupled to the workpiece contact element.

10. The method of claim 1, wherein discharging the air pressure in the control volume includes moving an activation element coupled to the trigger and the workpiece contact element.

11. The method of claim 1, which includes controlling a rate of discharge of the air pressure from the control volume via one or more cross-sectional gas flow areas of the pneumatic discharging connection.

12. The method of claim 1, which includes controlling an amount of time the drive-in tool is in the trip-ready based on a volume of the control volume.

13. The method of claim 1, which includes, responsive to an activation element being in a first position, disconnecting the pneumatic discharging connection between the control volume and the pressure sink, and causing the pneumatic charging connection between the control volume and the gas pressure source connection.

14. The method of claim 13, which includes, responsive to the activation element being in a different second position, disconnecting the pneumatic charging connection between the control volume and the gas pressure source connection, and causing the pneumatic discharging connection between the control volume and the pressure sink.

15. The method of claim 1, which includes, responsive to an activation element being in a first position, disconnecting the pneumatic discharging connection between the control volume and the pressure sink, causing the pneumatic charging connection between the control volume and the gas pressure source connection, and causing the drive-in tool to be in the secured state.

16. The method of claim 15, which includes, responsive to the activation element being in a different second position, disconnecting the pneumatic charging connection between the control volume and the gas pressure source connection, causing the pneumatic discharging connection between the control volume and the pressure sink, and causing the drive-in tool to switch from the secured state to the trip-ready state.

17. The method of claim 1, which includes providing the pneumatic charging connection between the control volume and the gas pressure source connection through an activation element.

18. The method of claim 1, which includes providing the pneumatic discharging connection between the control volume and the pressure sink extending through a movable activation element.

19. The method of claim 1, which includes providing the pneumatic charging connection between the control volume and the gas pressure source connection extending through a movable activation element when the activation element is in a first position and providing the pneumatic discharging connection between the control volume and the pressure sink extending through the activation element when the activation element is in a different second position.

20. The method of claim 1, which includes providing the pneumatic charging connection between the control volume and the gas pressure source connection extending through a movable activation element.

* * * * *